US011867808B2

(12) United States Patent
Droz et al.

(10) Patent No.: US 11,867,808 B2
(45) Date of Patent: *Jan. 9, 2024

(54) WAVEGUIDE DIFFUSERS FOR LIDARS

(71) Applicant: Waymo LLC, Mountain View, CA (US)

(72) Inventors: Pierre-Yves Droz, Los Altos, CA (US); David Neil Hutchison, Santa Clara, CA (US); James Dunphy, San Jose, CA (US); Nathaniel Golshan, Palo Alto, CA (US); Ralph Hamilton Shepard, Menlo Park, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/982,078

(22) Filed: Nov. 7, 2022

(65) Prior Publication Data

US 2023/0055071 A1    Feb. 23, 2023

Related U.S. Application Data

(63) Continuation of application No. 16/140,535, filed on Sep. 25, 2018, now Pat. No. 11,520,044.

(51) Int. Cl.
*G01S 17/02* (2020.01)
*G02B 27/09* (2006.01)
(Continued)

(52) U.S. Cl.
CPC .............. *G01S 17/02* (2013.01); *G02B 6/122* (2013.01); *G02B 27/0955* (2013.01); *G02B 2006/12104* (2013.01)

(58) Field of Classification Search
CPC ..... G01S 17/02; G02B 6/122; G02B 27/0955; G02B 2006/12104; G02B 5/09; G02B 6/00
See application file for complete search history.

(56) References Cited

U.S. PATENT DOCUMENTS 8,743,464 B1    6/2014  Amirparviz
9,671,548 B2    6/2017  Wald et al.
(Continued)

FOREIGN PATENT DOCUMENTS

CN    107533137 A    1/2018
CN    207020398 U    2/2018

OTHER PUBLICATIONS

International Search Report and Written Opinion for International Application No. PCT/2019/051982, dated Jan. 10, 2020.

*Primary Examiner* — Jennifer Doan
(74) *Attorney, Agent, or Firm* — McDonnell Boehnen Hulbert & Berghoff LLP

(57) ABSTRACT

One example system comprises a light source configured to emit light. The system also comprises a waveguide configured to guide the emitted light from a first end of the waveguide toward a second end of the waveguide. The waveguide has an output surface between the first end and the second end. The system also comprises a plurality of mirrors including a first mirror and a second mirror. The first mirror reflects a first portion of the light toward the output surface. The second mirror reflects a second portion of the light toward the output surface. The first portion propagates out of the output surface toward a scene as a first transmitted light beam. The second portion propagates out of the output surface toward the scene as a second transmitted light beam.

20 Claims, 11 Drawing Sheets

(51) Int. Cl.
*G02B 6/122* (2006.01)
*G02B 6/12* (2006.01)

(56) References Cited

U.S. PATENT DOCUMENTS

| | | |
|---|---|---|
| 9,823,351 B2 | 11/2017 | Haslim et al. |
| 11,520,044 B2 | 12/2022 | Droz et al. |
| 2002/0114168 A1* | 8/2002 | Pelka .................... F21S 43/245 362/582 |
| 2003/0090632 A1 | 5/2003 | Kim et al. |
| 2005/0117833 A1 | 6/2005 | Fukuzawa et al. |
| 2006/0132752 A1 | 6/2006 | Kane |
| 2009/0274419 A1 | 11/2009 | Sayers et al. |
| 2014/0078514 A1 | 3/2014 | Zhu |
| 2016/0178736 A1 | 6/2016 | Chung |
| 2016/0320568 A1 | 11/2016 | Haase et al. |
| 2017/0045669 A1 | 2/2017 | Nichol et al. |
| 2017/0153319 A1 | 6/2017 | Villeneuve et al. |
| 2017/0261680 A1 | 9/2017 | Wald et al. |
| 2017/0350983 A1 | 12/2017 | Hall et al. |
| 2018/0045965 A1 | 2/2018 | Schowengerdt |
| 2018/0088235 A1 | 3/2018 | Haslim et al. |
| 2018/0156659 A1 | 6/2018 | Droz et al. |
| 2018/0156971 A1 | 6/2018 | Droz et al. |
| 2018/0335629 A1* | 11/2018 | Cheng ..................... G06T 19/00 |

\* cited by examiner

WAVEGUIDE DIFFUSERS FOR LIDARS

CROSS-REFERENCE TO RELATED APPLICATIONS

This application is a continuation of U.S. patent application Ser. No. 16/140,535, filed Sep. 25, 2018, which is incorporated herein by reference.

BACKGROUND

Unless otherwise indicated herein, the materials described in this section are not prior art to the claims in this application and are not admitted to be prior art by inclusion in this section.

Light detectors, such as photodiodes, single photon avalanche diodes (SPADs), or other types of avalanche photodiodes (APDs), can be used to detect light that is imparted on their surfaces (e.g., by outputting an electrical signal, such as a voltage or a current, that indicates an intensity of the light). Many types of such devices are fabricated out of semiconducting materials, such as silicon. In order to detect light over a large geometric area, multiple light detectors can be arranged as an array. These arrays are sometimes referred to as silicon photomultipliers (SiPMs) or multi-pixel photon counters (MPPCs).

Light detectors can be employed in a variety of systems, such as cameras, scanners, imagers, and motion sensors, among other examples. Some active sensing systems, such as light detection and ranging (LIDAR) systems, 3D scanners, computing tomography (CT) scanners, laser scanners, and infrared (IR) scanners, among other examples, may operate by emitting light and then detecting reflections (or other scattered portions) of the emitted light. For example, a LIDAR system can determine distances to environmental features while scanning through a scene to assemble a "point cloud" indicative of reflective surfaces in the environment. Individual points in the point cloud can be determined, for example, by transmitting a laser pulse and detecting a returning pulse, if any, reflected from an object in the environment, and then determining a distance to the object according to a time delay between the transmission of the pulse and the reception of the reflected pulse.

SUMMARY

In one example, a system comprises a light source configured to emit light. The system also comprises a waveguide configured to guide the light from a first end of the waveguide toward a second side of the waveguide. The waveguide has an output surface between the first end and the second end. The system also comprises a plurality of mirrors including a first mirror and a second mirror. The first mirror reflects a first portion of the light toward the output surface of the waveguide. The second mirror reflects a second portion of the light toward the output surface. The first portion propagates, after being reflected by the first mirror, out of the output surface toward a scene as a first transmitted light beam. The second portion propagates, after being reflected by the second mirror, out of the output surface toward the scene as a second transmitted light beam.

In another example, a light detection and ranging (LIDAR) device comprises a plurality of mirrors including a first mirror and a second mirror. The LIDAR device transmits a plurality of light beams to illuminate a scene. The plurality of transmitted light beams includes a first transmitted light beam and a second transmitted light beam. The plurality of transmitted light beams is arranged spatially based on a physical arrangement of the plurality of mirrors. The LIDAR device also comprises a light emitter and a waveguide. The waveguide is configured to guide emitted light from the light emitter toward the plurality of mirrors. The first mirror is configured to reflect a first portion of the light toward an output side of the waveguide as the first transmitted light beam. The second mirror reflects a second portion of the light toward the output side of the waveguide as the second transmitted light beam.

In yet another example, a method involves emitting light toward a first end of a waveguide. The method also involves guiding, inside a waveguide, the light toward a second end of the waveguide. The waveguide has an output surface between the first end and the second end. The method also involves reflecting a first portion of the light toward the output surface of the waveguide. The first portion propagates out of the output surface of the waveguide toward a scene as a first transmitted light beam. The method also involves reflecting a second portion of the light toward the output surface of the waveguide. The second portion propagates out of the output surface of the waveguide toward the scene as a second transmitted light beam.

In still another example, a system comprises means for emitting light toward a first end of a waveguide. The system also comprises means for guiding, inside a waveguide, the emitted light toward a second end of the waveguide. The waveguide has an output surface between the first end and the second end. The system also comprises means for reflecting a first portion of the guided light toward the output surface of the waveguide. The reflected first portion propagates out of the output surface of the waveguide toward a scene as a first transmitted light beam. The system also comprises means for reflecting a second portion of the guided light toward the output surface of the waveguide. The reflected second portion propagates out of the output surface of the waveguide toward the scene as a second transmitted light beam.

The foregoing summary is illustrative only and is not intended to be in any way limiting. In addition to the illustrative aspects, embodiments, and features described above, further aspects, embodiments, and features will become apparent by reference to the figures and the following detailed description.

DETAILED DESCRIPTION

Figure 1A:
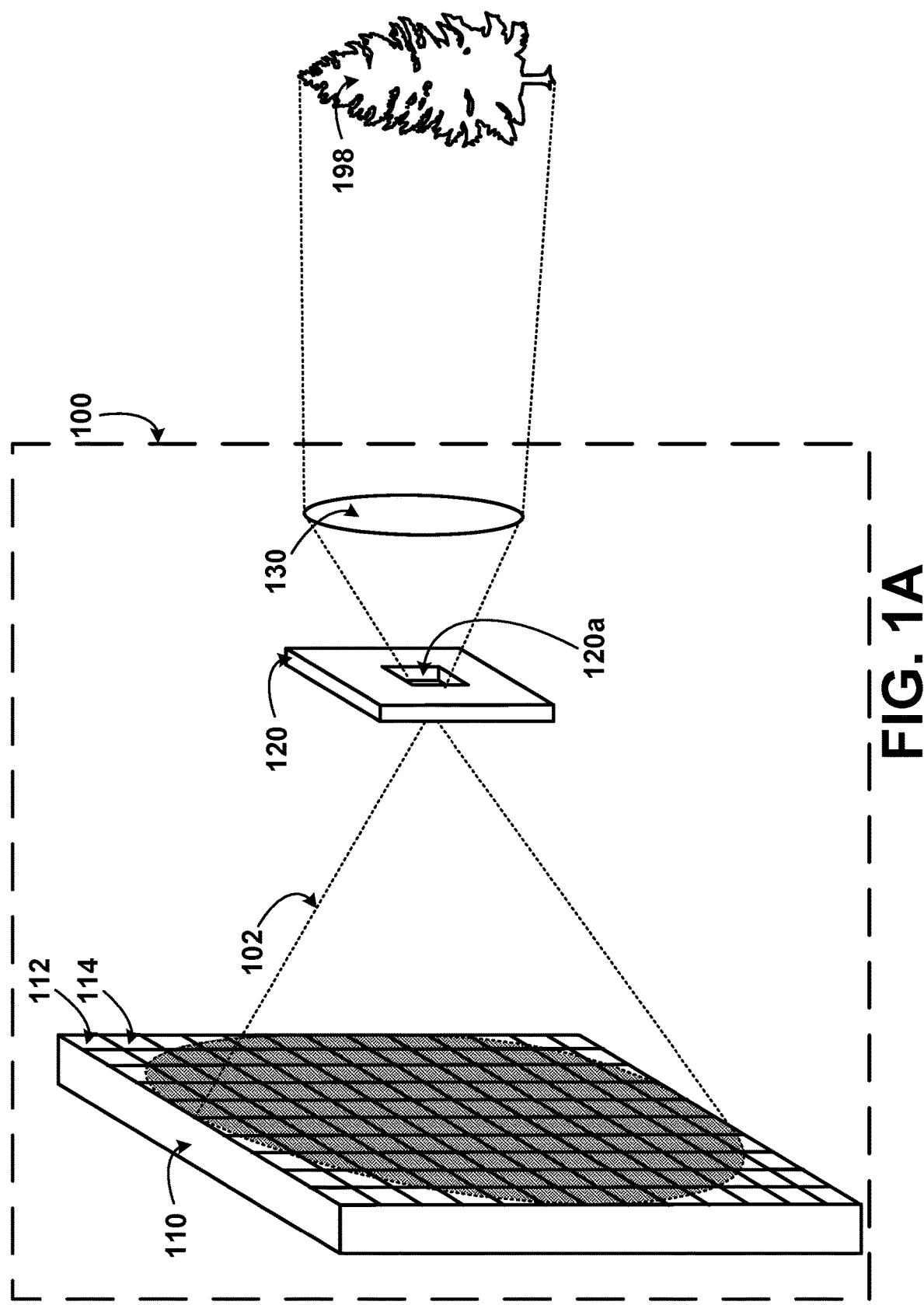
FIG. 1A is an illustration of a system that includes an aperture, according to example embodiments.

Any example embodiment or feature described herein is not necessarily to be construed as preferred or advantageous over other embodiments or features. The example embodiments described herein are not meant to be limiting. It will be readily understood that certain aspects of the disclosed implementations can be arranged and combined in a wide variety of different configurations. Furthermore, the particular arrangements shown in the figures should not be viewed as limiting. It should be understood that other implementations might include more or less of each element shown in a given figure. In addition, some of the illustrated elements may be combined or omitted. Similarly, an example implementation may include elements that are not illustrated in the figures.

I. OVERVIEW

One example system includes a lens. The lens may be used to focus light from a scene. However, the lens may also focus background light not intended to be observed by the system (e.g., sunlight). In order to selectively filter the light (e.g., separate background light from light corresponding to information within the scene), an opaque material (e.g., selectively etched metal, a glass substrate partially covered by a mask, etc.) may be placed behind the lens. The opaque material could be shaped as a slab, a sheet, or various other shapes in a variety of embodiments. Within the opaque material, an aperture may be defined. With this arrangement, a portion of, or the entirety of, the light focused by the lens could be selected for transmission through the aperture.

In the direction of propagation of the light transmitted through the aperture, the system may include at least one light detector (e.g., array of SPADs, etc.) arranged to detect at least a portion of the focused light transmitted through the aperture.

The system may also include a light source that emits light, and a waveguide that receives the emitted light at an input end of the waveguide. The waveguide guides the emitted light from the input end to an output end of the waveguide opposite the input end. The waveguide has a given side that extends from the input end to the output end. At or near the output end, the waveguide transmits at least a portion of the emitted light out of the given side and toward the lens. In general, the output end may be aligned with a path of the focused light propagating from the lens to the light detector. In one embodiment, the emitted light transmitted out of the waveguide may propagate through the same aperture through which the focused light from the lens is transmitted toward the light detector.

To facilitate transmitting the guided light out of the waveguide (and through the given side), in some examples, the system may include an output mirror disposed along a propagation path of the guided light propagating inside the waveguide (e.g., at or near the output end). The output mirror may be tilted toward the given side of the waveguide. As such, the output mirror may reflect the guided light (or a portion thereof) toward a particular region of the given side. For example, the particular region may be aligned with the path of the focused light transmitted through the aperture.

With this arrangement, the system may direct the emitted light in a transmit path that extends through the aperture and the lens (toward the scene); and the system may focus returning reflections of the emitted light in a receive path that extends through the same lens and the same aperture. Thus, in this example, the transmit and receive paths may be spatially co-aligned (e.g., because both paths are defined using the same aperture and the same lens).

By spatially aligning the transmit path with the receive path, the example system may reduce (or prevent) optical scanning distortions associated with parallax. For instance, if the transmit and receive paths were instead spatially offset relative to one another (e.g., mismatch between the respective pointing or viewing directions, etc.), a scanned representation of the scene could be affected by optical distortions such as parallax.

Other aspects, features, implementations, configurations, arrangements, and advantages are possible.

II. EXAMPLE SYSTEMS AND DEVICES

FIG. 1A is an illustration of a system 100 that includes an aperture, according to example embodiments. As shown, system 100 includes an array 110 of light detectors (exemplified by detectors 112 and 114), an aperture 120a defined within an opaque material 120, and a lens 130. System 100 may measure light 102 reflected or scattered by an object 198 within a scene. In some instances, light 102 may also include light propagating directly from background sources (not shown) toward lens 130. In some examples, system 100 may be included in a light detection and ranging (LIDAR) device. In one example, the LIDAR device may be used for navigation of an autonomous vehicle. In some embodiments, system 100, or portions thereof, may be contained within an area that is unexposed to external light other than through lens 130. This may reduce an amount of ambient light (which may affect measurements) reaching the detectors in array 110.

Array 110 includes an arrangement of light detectors, exemplified by detectors 112 and 114. In various embodiments, array 110 may have different shapes. As shown, array 110 has a rectangular shape. However, in other embodiments, array 110 may be circular or may have a different shape. The size of array 110 may be selected according to an expected cross-sectional area of light 110 diverging from aperture 120a. For example, the size of array 110 may be based on the distance between array 110 and aperture 120a, the distance between aperture 120a and lens 130, dimensions of aperture 120a, optical characteristics of lens 130, among other factors. In some embodiments, array 110 may be movable. For example, the location of array 110 may be adjustable so as to be closer to, or further from, aperture 120a. To that end, for instance, array 110 could be mounted on an electrical stage capable of translating in one, two, or three dimensions.

Further, in some implementations, array 110 may provide one or more outputs to a computing device or logic circuitry. For example, a microprocessor-equipped computing device may receive electrical signals from array 110 which indicate an intensity of light 102 incident on array 110. The computing device may then use the electrical signals to determine information about object 198 (e.g., distance between object 198 and system 100, etc.). In some embodiments, some or all of the light detectors within array 110 may be interconnected with one another in parallel. To that end, for example, array 110 may be a SiPM or an MPPC, depending on the particular arrangement and type of the light detectors within array 110. By connecting the light detectors in a parallel circuit configuration, for instance, the outputs from the light detectors can be combined to effectively increase a detection area in which a photon in light 102 can be detected (e.g., shaded region of array 110 shown in FIG. 1A).

Light detectors 112, 114, etc., may include various types of light detectors. In one example, detectors 112, 114, etc., include SPADs. SPADs may employ avalanche breakdown within a reverse biased p-n junction (i.e., diode) to increase an output current for a given incident illumination on the SPAD. Further, SPADs may be able to generate multiple electron-hole pairs for a single incident photon. In another example, light detectors 112, 114, etc., may include linear-mode avalanche photodiodes (APDs). In some instances, APDs or SPADs may be biased above an avalanche breakdown voltage. Such a biasing condition may create a positive feedback loop having a loop gain that is greater than one. Further, SPADs biased above the threshold avalanche breakdown voltage may be single photon sensitive. In other examples, light detectors 112, 114, etc., may include photoresistors, charge-coupled devices (CCDs), photovoltaic cells, and/or any other type of light detector.

In some implementations, array 110 may include more than one type of light detector across the array. For example, array 110 can be configured to detect multiple predefined wavelengths of light 102. To that end, for instance, array 110 may comprise some SPADs that are sensitive to one range of wavelengths and other SPADs that are sensitive to a different range of wavelengths. In some embodiments, light detectors 110 may be sensitive to wavelengths between 400 nm and 1.6 µm (visible and/or infrared wavelengths). Further, light detectors 110 may have various sizes and shapes within a given embodiment or across various embodiments. In some embodiments, light detectors 112, 114, etc., may include SPADs that have package sizes that are 1%, 0.1%, or 0.01% of the area of array 110.

Opaque material 120 (e.g., mask, etc.) may block a portion of light 102 from the scene (e.g., background light) that is focused by the lens 130 from being transmitted to array 110. For example, opaque material 120 may be configured to block certain background light that could adversely affect the accuracy of a measurement performed by array 110. Alternatively or additionally, opaque material 120 may block light in the wavelength range detectable by detectors 112, 114, etc. In one example, opaque material 120 may block transmission by absorbing a portion of incident light. In another example, opaque material 120 may block transmission by reflecting a portion of incident light. A non-exhaustive list of example implementations of opaque material 120 includes an etched metal, a polymer substrate, a biaxially-oriented polyethylene terephthalate (BoPET) sheet, or a glass overlaid with an opaque mask, among other possibilities. In some examples, opaque material 120, and therefore aperture 120a, may be positioned at or near a focal plane of lens 130.

Aperture 120a provides a port within opaque material 120 through which light 102 (or a portion thereof) may be transmitted. Aperture 120a may be defined within opaque material 120 in a variety of ways. In one example, opaque material 120 (e.g., metal, etc.) may be etched to define aperture 120a. In another example, opaque material 120 may be configured as a glass substrate overlaid with a mask, and the mask may include a gap that defines aperture 120a (e.g., via photolithography, etc.). In various embodiments, aperture 120a may be partially or wholly transparent, at least to wavelengths of light that are detectable by light detectors 112, 114, etc. For example, where opaque material 120 is a glass substrate overlaid with a mask, aperture 120a may be defined as a portion of the glass substrate not covered by the mask, such that aperture 120a is not completely hollow but rather made of glass. Thus, in some instances, aperture 120a may be nearly, but not entirely, transparent to one or more wavelengths of light 102 (e.g., glass substrates are typically not 100% transparent). Alternatively, in some instances, aperture 120a may be formed as a hollow region of opaque material 120.

In some examples, aperture 120a (in conjunction with opaque material 120) may be configured to spatially filter light 102 from the scene at the focal plane. To that end, for example, light 102 may be focused onto a focal plane along a surface of opaque material 120, and aperture 120a may allow only a portion of the focused light to be transmitted to array 110. As such, aperture 120a may behave as an optical pinhole. In one embodiment, aperture 120a may have a cross-sectional area of between 0.02 mm$^2$ and 0.06 mm$^2$ (e.g., 0.04 mm$^2$). In other embodiments, aperture 120a may have a different cross-sectional area depending on various factors such as optical characteristics of lens 130, distance to array 110, noise rejection characteristics of the light detectors in array 110, etc.

Thus, although the term "aperture" as used above with respect to aperture 120a may describe a recess or hole in an opaque material through which light may be transmitted, it is noted that the term "aperture" may include a broad array of optical features. In one example, as used throughout the description and claims, the term "aperture" may additionally encompass transparent or translucent structures defined within an opaque material through which light can be at least partially transmitted. In another example, the term "aperture" may describe a structure that otherwise selectively limits the passage of light (e.g., through reflection or refraction), such as a mirror surrounded by an opaque material. In one example embodiment, mirror arrays surrounded by an opaque material may be arranged to reflect light in a certain direction, thereby defining a reflective portion, which may be referred to as an "aperture".

Although aperture 120a is shown to have a rectangular shape, it is noted that aperture 120a can have a different shape, such as a round shape, circular shape, elliptical shape, among others. In some examples, aperture 120a can alternatively have an irregular shape specifically designed to account for optical aberrations within system 100. For example, a keyhole shaped aperture may assist in accounting for parallax occurring between an emitter (e.g., light source that emits light 102) and a receiver (e.g., lens 130 and array 110). The parallax may occur if the emitter and the receiver are not located at the same position, for example. Other irregular aperture shapes are also possible, such as specifically shaped apertures that correspond with particular objects expected to be within a particular scene or irregular apertures that select specific polarizations of light 102 (e.g., horizontal or vertical polarizations).

Lens 130 may focus light 102 from the scene onto the focal plane where aperture 120a is positioned. With this arrangement, the light intensity collected from the scene, at lens 130, may be focused to have a reduced cross-sectional area over which light 102 is projected (i.e., increasing the spatial power density of light 102). For example, lens 130 may include a converging lens, a biconvex lens, and/or a spherical lens, among other examples. Alternatively, lens 130 can be implemented as a consecutive set of lenses positioned one after another (e.g., a biconvex lens that focuses light in a first direction and an additional biconvex lens that focuses light in a second direction). Other types of lenses and/or lens arrangements are also possible. In addition, system 100 may include other optical elements (e.g., mirrors, etc.) positioned near lens 130 to aid in focusing light 102 incident on lens 130 onto opaque material 120.

Object 198 may be any object positioned within a scene surrounding system 100. In implementations where system 100 is included in a LIDAR device, object 198 may be illuminated by a LIDAR transmitter that emits light (a portion of which may return as light 102). In example embodiments where the LIDAR device is used for navigation of an autonomous vehicle, object 198 may be or include pedestrians, other vehicles, obstacles (e.g., trees, debris, etc.), or road signs, among other types of objects.

As noted above, light 102 may be reflected or scattered by object 198, focused by lens 130, transmitted through aperture 120a in opaque material 120, and measured by light detectors in array 110. This sequence may occur (e.g., in a LIDAR device) to determine information about object 198. In some embodiments, light 102 measured by array 110 may additionally or alternatively include light reflected or scattered off multiple objects, transmitted by a transmitter of another LIDAR device, ambient light, sunlight, among other possibilities.

In some examples, the wavelength(s) of light 102 used to analyze object 198 may be selected based on the types of objects expected to be within a scene and their expected distance from lens 130. For example, if an object expected to be within the scene absorbs all incoming light of 500 nm wavelength, a wavelength other than 500 nm may be selected to illuminate object 198 and to be analyzed by system 100. The wavelength of light 102 (e.g., if transmitted by a transmitter of a LIDAR device) may be associated with a source that generates light 102 (or a portion thereof). For example, if the light is generated by a laser diode, light 102 may comprise light within a wavelength range that includes 900 nm (or other infrared and/or visible wavelength). Thus, various types of light sources are possible for generating light 102 (e.g., an optical fiber amplifier, various types of lasers, a broadband source with a filter, etc.).

As shown, light 102 diverges as it propagates away from aperture 120a. Due to the divergence, a detection area at array 110 (e.g., shown as shaded area illuminated by light 102) may be larger than a cross-sectional area of aperture 120a. An increased detection area (e.g., measured in m$^2$) for a given light power (e.g., measured in W) may lead to a reduced light intensity (e.g., measured in $$\frac{W}{m^2}$$

incident on array 110.

The reduction in light intensity may be particularly beneficial in embodiments where array 110 includes SPADs or other light detectors having high sensitivities. For example, SPADs derive their sensitivity from a large reverse-bias voltage that produces avalanche breakdown within a semiconductor. This avalanche breakdown can be triggered by the absorption of a single photon, for example. Once a SPAD absorbs a single photon and the avalanche breakdown begins, the SPAD cannot detect additional photons until the SPAD is quenched (e.g., by restoring the reverse-bias voltage). The time until the SPAD is quenched may be referred to as the recovery time. If additional photons are arriving at time intervals approaching the recovery time (e.g., within a factor of ten), the SPAD may begin to saturate, and the measurements by the SPAD may thus become less reliable. By reducing the light power incident on any individual light detector (e.g., SPAD) within array 110, the light detectors (e.g., SPADs) in array 110 may remain unsaturated. As a result, the light measurements by each individual SPAD may have an increased accuracy.

Figure 1B:
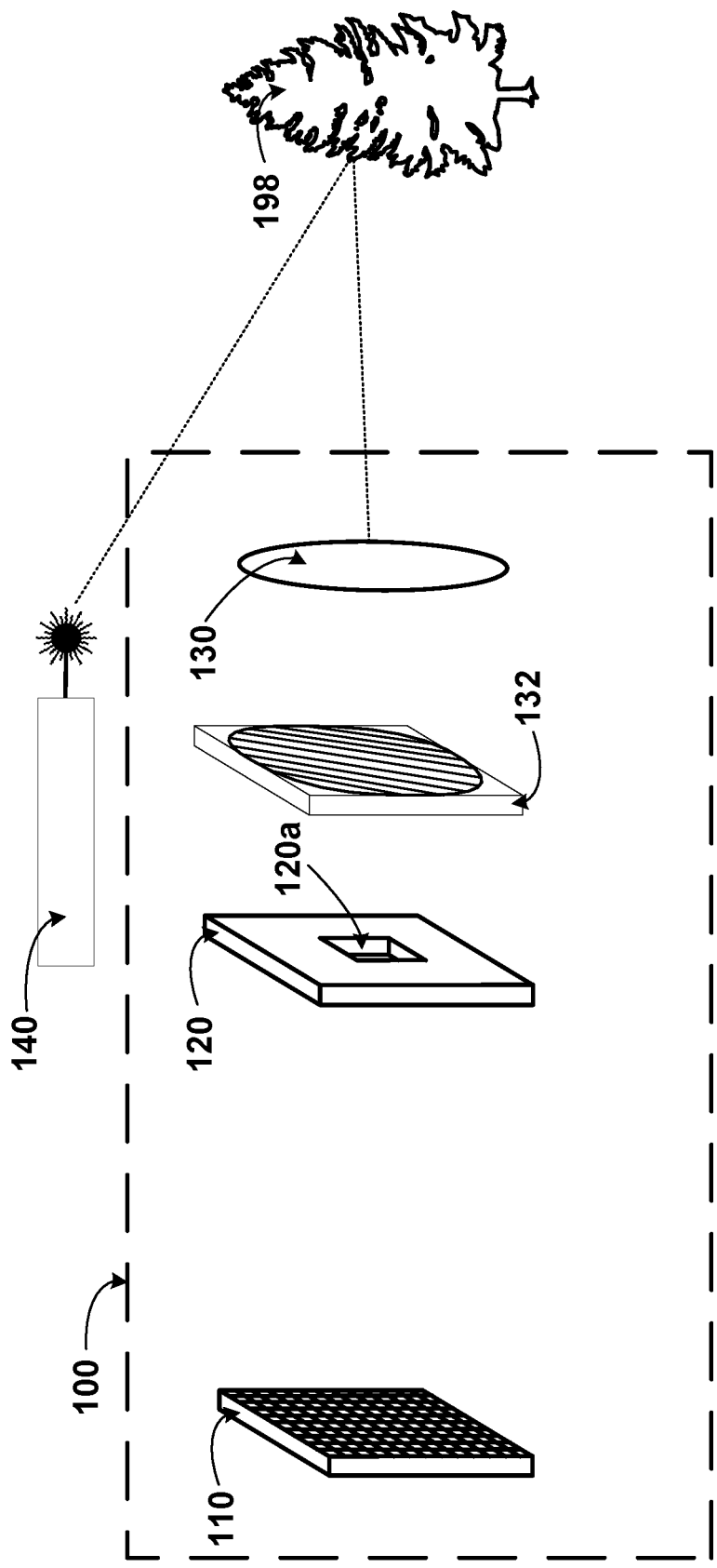
FIG. 1B is another illustration of the system of FIG. 1A.

FIG. 1B is another illustration of system 100. As shown, system 100 also includes a light filter 132 and a light emitter 140. Filter 132 may include any optical filter configured to selectively transmit light within a predefined wavelength range. For example, filter 132 can be configured to selectively transmit light within a visible wavelength range, an infrared wavelength range, or any other wavelength range of the light signal emitted by emitter 140. For example, optical filter 132 may be configured to attenuate light of particular wavelengths or divert light of particular wavelengths away from the array 110. For instance, optical filter 132 may attenuate or divert wavelengths of light 102 that are outside of the wavelength range emitted by emitter 140. Therefore, optical filter 132 may, at least partially, reduce ambient light or background light from adversely affecting measurements by array 110.

In various embodiments, optical filter 132 may be located in various positions relative to array 110. As shown, optical filter 132 is located between lens 130 and opaque material 120. However, optical filter 132 may alternatively be located between lens 130 and object 198, between opaque material 120 and array 110, combined with array 110 (e.g., array 110 may have a surface screen that optical filter 132, or each of the light detectors in array 110 may individually be covered by a separate optical filter, etc.), combined with aperture 120a (e.g., aperture 120a may be transparent only to a particular wavelength range, etc.), or combined with lens 130 (e.g., surface screen disposed on lens 130, material of lens 130 transparent only to a particular wavelength range, etc.), among other possibilities.

As shown in FIG. 1B, light emitter 140 emits a light signal to be measured by array 110. Emitter 140 may include a laser diode, fiber laser, a light-emitting diode, a laser bar, a nanostack diode bar, a filament, a LIDAR transmitter, or any other light source. As shown, emitter 140 may emit light which is reflected by object 198 in the scene and ultimately measured (at least a portion thereof) by array 110. In some embodiments, emitter 140 may be implemented as a pulsed laser (as opposed to a continuous wave laser), allowing for increased peak power while maintaining an equivalent continuous power output.

Figure 2A:
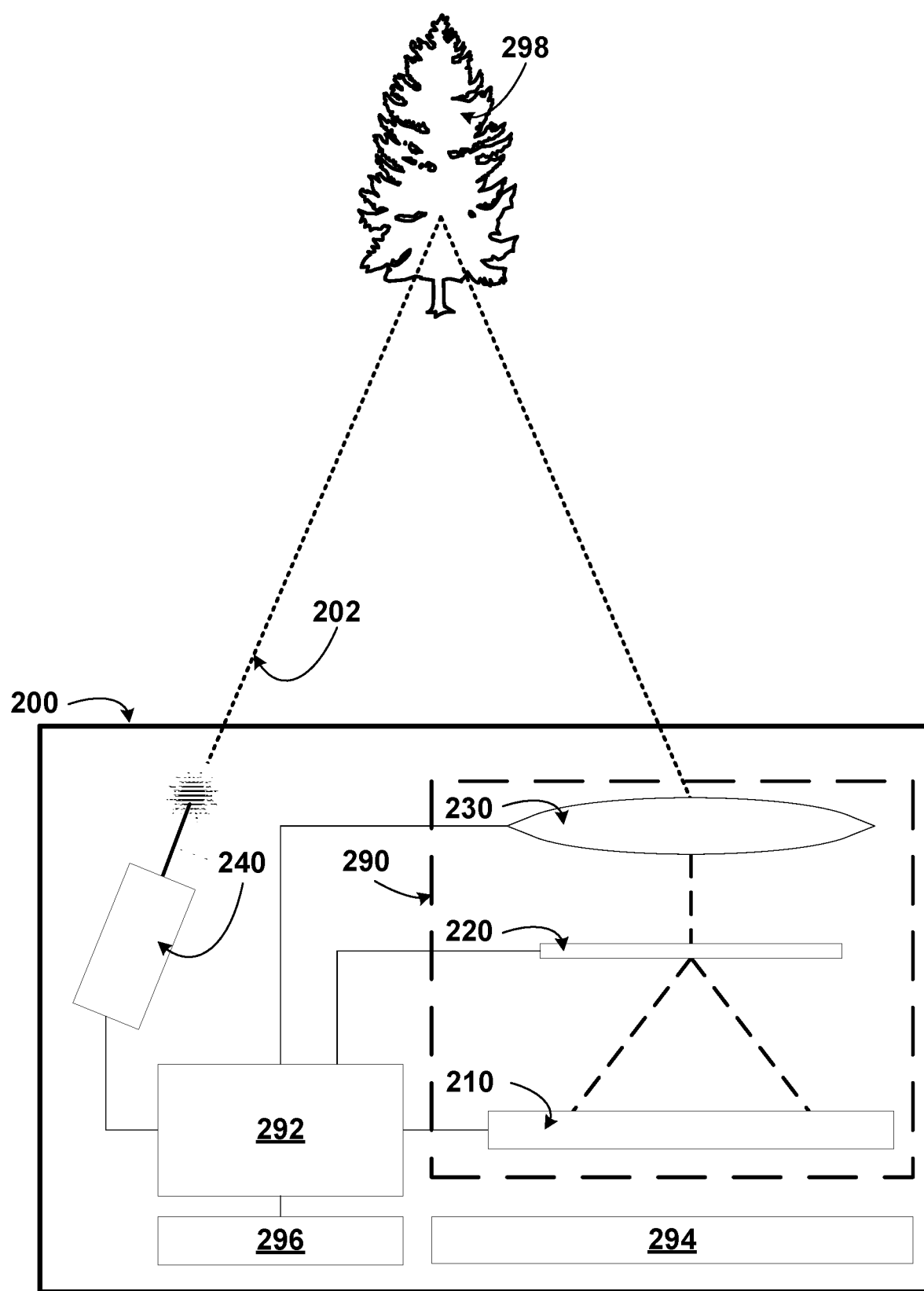
FIG. 2A is a simplified block diagram of a LIDAR device, according to example embodiments.

FIG. 2A is a simplified block diagram of a LIDAR device 200, according to example embodiments. In some example embodiments, LIDAR device 200 can be mounted to a vehicle and employed to map a surrounding environment (e.g., the scene including object 298, etc.) of the vehicle. As shown, LIDAR device 200 includes a laser emitter 240 that may be similar to emitter 140, a system 290 that may be similar to system 100, a controller 292, a rotating platform 294, and one or more actuators 296.

System 290 includes an array 210 of light detectors, an opaque material 220, and a lens 230, which can be similar, respectively, to array 110, opaque material 120, and lens 130. It is noted that LIDAR device 200 may alternatively include more or fewer components than those shown. For example, LIDAR device 200 may include an optical filter (e.g., filter 132). Thus, system 290 can be implemented similarly to system 100 and/or any other system herein.

Device 200 may operate emitter 240 to emit light 202 toward a scene that includes object 298, similarly to, respectively, emitter 140, light 102, and object 198 of device 100. To that end, in some implementations, emitter 240 (and/or one or more other components of device 200) can be configured as a LIDAR transmitter of LIDAR device 200. Device 200 may then detect reflections of light 202 returning from the scene to determine information about object 298. To that end, in some implementations, array 210 (and/or one or more other components of system 290) can be configured as a LIDAR receiver of LIDAR device 200.

Controller 292 may be configured to control one or more components of LIDAR device 200 and to analyze signals received from the one or more components. To that end, controller 292 may include one or more processors (e.g., a microprocessor, etc.) that execute instructions stored in a memory (not shown) of device 200 to operate device 200. Additionally or alternatively, controller 292 may include digital or analog circuitry wired to perform one or more of the various functions described herein.

Rotating platform 294 may be configured to rotate about an axis to adjust a pointing direction of LIDAR 200 (e.g., direction of emitted light 202 relative to the environment, etc.). To that end, rotating platform 294 can be formed from any solid material suitable for supporting one or more components of LIDAR 200. For example, system 290 (and/or emitter 240) may be supported (directly or indirectly) by rotating platform 294 such that each of these components moves relative to the environment while remaining in a particular relative arrangement in response to rotation of rotating platform 294. In particular, the mounted components could be rotated (simultaneously) about an axis so that LIDAR 200 may adjust its pointing direction while scanning the surrounding environment. In this manner, a pointing direction of LIDAR 200 can be adjusted horizontally by actuating rotating platform 294 to different directions about the axis of rotation. In one example, LIDAR 200 can be mounted on a vehicle, and rotating platform 294 can be rotated to scan regions of the surrounding environment at various directions from the vehicle.

In order to rotate platform 294 in this manner, one or more actuators 296 may actuate rotating platform 294. To that end, actuators 296 may include motors, pneumatic actuators, hydraulic pistons, and/or piezoelectric actuators, among other possibilities.

With this arrangement, controller 292 could operate actuator(s) 296 to rotate rotating platform 294 in various ways so as to obtain information about the environment. In one example, rotating platform 294 could be rotated in either direction about an axis. In another example, rotating platform 294 may carry out complete revolutions about the axis such that LIDAR 200 scans a 360° field-of-view (FOV) of the environment. In yet another example, rotating platform 294 can be rotated within a particular range (e.g., by repeatedly rotating from a first angular position about the axis to a second angular position and back to the first angular position, etc.) to scan a narrower FOV of the environment. Other examples are possible.

Moreover, rotating platform 294 could be rotated at various frequencies so as to cause LIDAR 200 to scan the environment at various refresh rates. In one embodiment, LIDAR 200 may be configured to have a refresh rate of 10 Hz. For example, where LIDAR 200 is configured to scan a 360° FOV, actuator(s) 296 may rotate platform 294 for ten complete rotations per second.

Figure 2B:
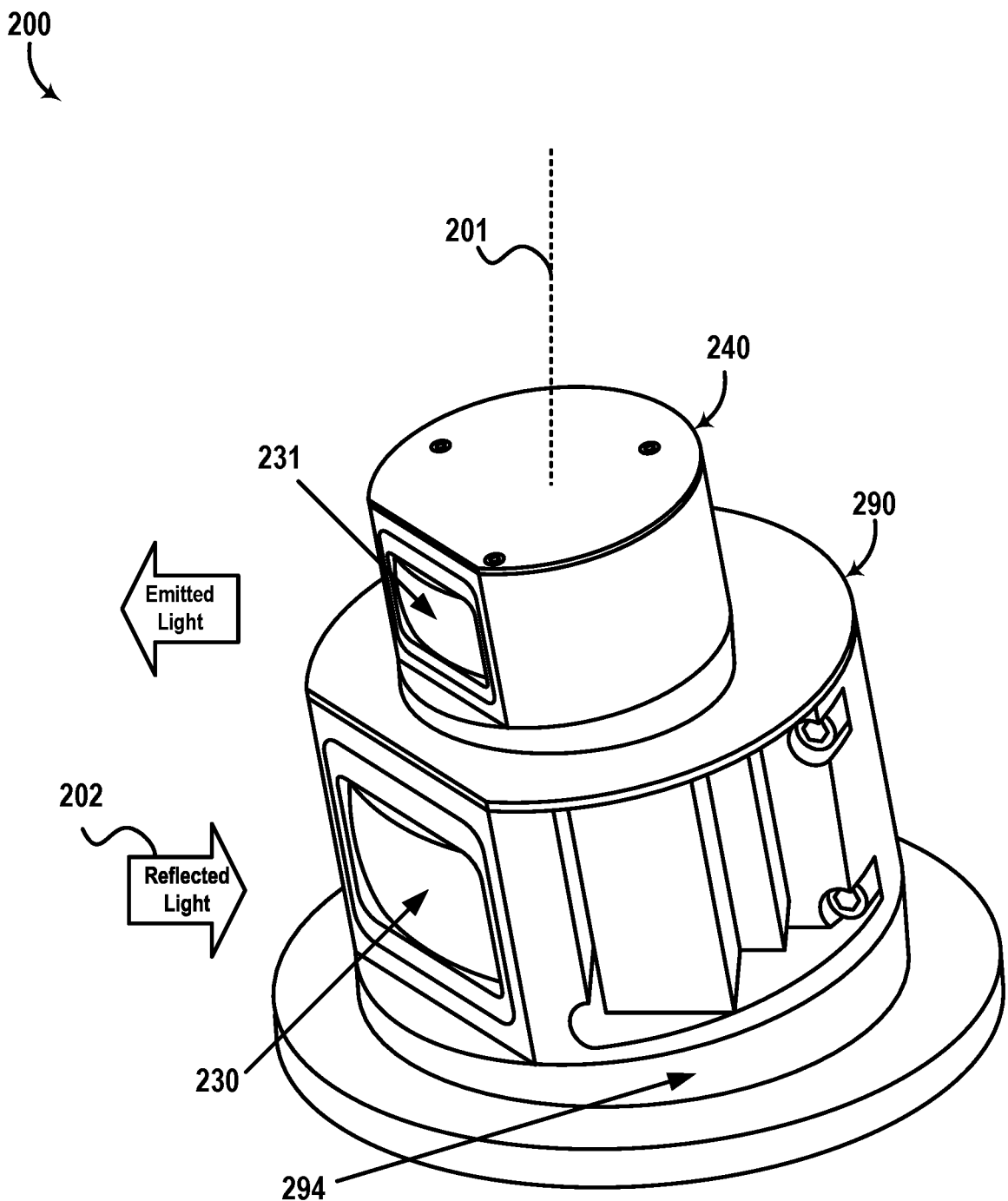
FIG. 2B illustrates a perspective view of the LIDAR device of FIG. 2A.

FIG. 2B illustrates a perspective view of LIDAR device 200. As shown, device 200 also includes a transmitter lens 231 that directs emitted light from emitter 240 toward the environment of device 200. To that end, FIG. 2B illustrates an example implementation of device 200 where emitter 240 and system 290 each have separate respective optical lenses 231 and 230. However, in other embodiments, device 200 can be alternatively configured to have a single shared lens for both emitter 240 and system 290. By using a shared lens to both direct the emitted light and receive the incident light (e.g., light 202), advantages with respect to size, cost, and/or complexity can be provided. For example, with a shared lens arrangement, device 200 can reduce and/or prevent parallax associated with transmitting light 202 (by emitter 240) from a different viewpoint than a viewpoint from which light 202 is received (by system 290).

As shown in FIG. 2B, light beams emitted by emitter 240 propagate from lens 231 toward an environment of LIDAR 200, and then return (e.g., after reflecting off one or more objects in the environment) as reflected light 202. LIDAR 200 may then receive reflected light 202 (e.g., through lens 230) and provide data pertaining to the one or more objects (e.g., distance between the one or more objects and the LIDAR 200, etc.).

Further, as shown in FIG. 2B, rotating platform 294 mounts system 290 and emitter 240 in the particular relative arrangement shown. By way of example, if rotating platform 294 rotates about axis 201, the pointing directions of system 290 and emitter 240 may simultaneously change according to the particular relative arrangement shown. Through this process, LIDAR 200 can scan different regions of the surrounding environment according to different rotational positions of LIDAR 200 about axis 201. For instance, device 200 (and/or another computing system) can determine a three-dimensional map of a 360° (or less) view of the environment of device 200 by processing data associated with different pointing directions of LIDAR 200 as the LIDAR rotates about axis 201.

In some examples, axis 201 may be substantially vertical. In these examples, the pointing direction of device 200 can be adjusted horizontally by rotating system 290 (and emitter 240) about axis 201.

In some examples, system 290 (and emitter 240) can be tilted (relative to axis 201) to adjust the vertical extents of the FOV of LIDAR 200. By way of example, LIDAR device 200 can be mounted on top of a vehicle. In this example, system 290 (and emitter 240) can be tilted (e.g., toward the vehicle) to collect more data points from regions of the environment that are closer to a driving surface on which the vehicle is located than data points from regions of the environment that are above the vehicle. Other mounting positions, tilting configurations, and/or applications of LIDAR device 200 are possible as well (e.g., on a different side of the vehicle, on a robotic device, or on any other mounting surface).

It is noted that the shapes, positions, and sizes of the various components of device 200 can vary, and are illustrated as shown in FIG. 2B only for the sake of example.

Returning now to FIG. 2A, in some implementations, controller 292 may use timing information associated with a signal measured by array 210 to determine a location (e.g., distance from LIDAR device 200) of object 298. For example, in embodiments where emitter 240 is a pulsed laser, controller 292 can monitor timings of output light pulses and compare those timings with timings of signal pulses measured by array 210. For instance, controller 292 can estimate a distance between device 200 and object 298 based on the speed of light and the time of travel of the light pulse (which can be calculated by comparing the timings). In one implementation, during the rotation of platform 294, emitter 240 may emit light pulses (e.g., light 202), and system 290 may detect reflections of the emitted light pulses. Device 200 (or another computer system that processes data from device 200) can then generate a three-dimensional (3D) representation of the scanned environment based on a comparison of one or more characteristics (e.g., timing, pulse length, light intensity, etc.) of the emitted light pulses and the detected reflections thereof.

In some implementations, controller 292 may be configured to account for parallax (e.g., due to laser emitter 240 and lens 230 not being located at the same location in space). By accounting for the parallax, controller 292 can improve accuracy of the comparison between the timing of the output light pulses and the timing of the signal pulses measured by the array 210.

In some implementations, controller 292 could modulate light 202 emitted by emitter 240. For example, controller 292 could change the projection (e.g., pointing) direction of emitter 240 (e.g., by actuating a mechanical stage, such as platform 294 for instance, that mounts emitter 240). As another example, controller 292 could modulate the timing, the power, or the wavelength of light 202 emitted by emitter 240. In some implementations, controller 292 may also control other operational aspects of device 200, such as adding or removing filters (e.g., filter 132) along a path of propagation of light 202, adjusting relative positions of various components of device 200 (e.g., array 210, opaque material 220 (and an aperture therein), lens 230, etc.), among other possibilities.

In some implementations, controller 292 could also adjust an aperture (not shown) within material 220. In some embodiments, the aperture may be selectable from a number of apertures defined within the opaque material. In some embodiments, a MEMS mirror could be located between lens 230 and opaque material 220 and may be adjustable by controller 292 to direct the focused light from lens 230 to one of the multiple apertures. In some embodiments, the various apertures may have different shapes and/or sizes. In some embodiments, an aperture may be defined by an iris (or other type of diaphragm). The iris may be expanded or contracted by controller 292, for example, to control the size or shape of the aperture.

Thus, in some examples, LIDAR device 200 can modify a configuration of system 290 to obtain additional or different information about object 298 and/or the scene. In one example, controller 292 may select a larger aperture in response to a determination that background noise received by system 290 from the scene is currently relatively low (e.g., during night-time). The larger aperture, for instance, may allow system 290 to detect a portion of light 202 that would otherwise be focused by lens 230 outside the aperture. In another example, controller 292 may select a different aperture position to intercept a portion of light 202 arriving at lens 230 from a particular receive path or viewing angle. In yet another example, controller 292 could adjust the distance between an aperture and light detector array 210. By doing so, for instance, the cross-sectional area of a detection region in array 210 (i.e., cross-sectional area of light 202 at array 210) can be adjusted as well. For example, in FIG. 1A, the detection region of array 110 is indicated by shading on array 110.

However, in some scenarios, the extent to which the configuration of system 290 can be modified may depend on various factors such as a size of LIDAR device 200 or system 290, among other factors. For example, referring back to FIG. 1A, a size of array 110 may depend on an extent of divergence of light 102 from a location of aperture 120a to a location of array 110. Thus, for instance, the maximum vertical and horizontal extents of array 110 may depend on the physical space available for accommodating system 100 within a LIDAR device. Similarly, for instance, an available range of values for the distance between array 110 and aperture 120a may also be limited by physical limitations of a LIDAR device where system 100 is employed. Accordingly, example implementations are described herein for space-efficient systems that provide an increased detection area in which light detectors can intercept light from the scene and reduce background noise.

In some scenarios, a scanned representation of object 298 (e.g., computed using controller 292, or using an external computer that receives data from LIDAR 200, etc.) may be susceptible to parallax associated with a spatial offset between the transmit path of light 202 (e.g., emitted by emitter 240 via lens 231 of FIG. 2B) and the receive path of reflected light 202 incident on lens 230. Accordingly, example implementations are described herein for reducing and/or mitigating the effects of such parallax. In one example, device 200 may alternatively incorporate emitter 240 within system 290 to co-align the LIDAR transmit and receive paths of LIDAR 200 (e.g., by causing both paths to extend through the same lens 230 and a same aperture in opaque material 220).

It is noted that the various functional blocks shown for the components of device 200 can be redistributed, rearranged, combined, and/or separated in various ways different than the arrangement shown.

Figure 3A:
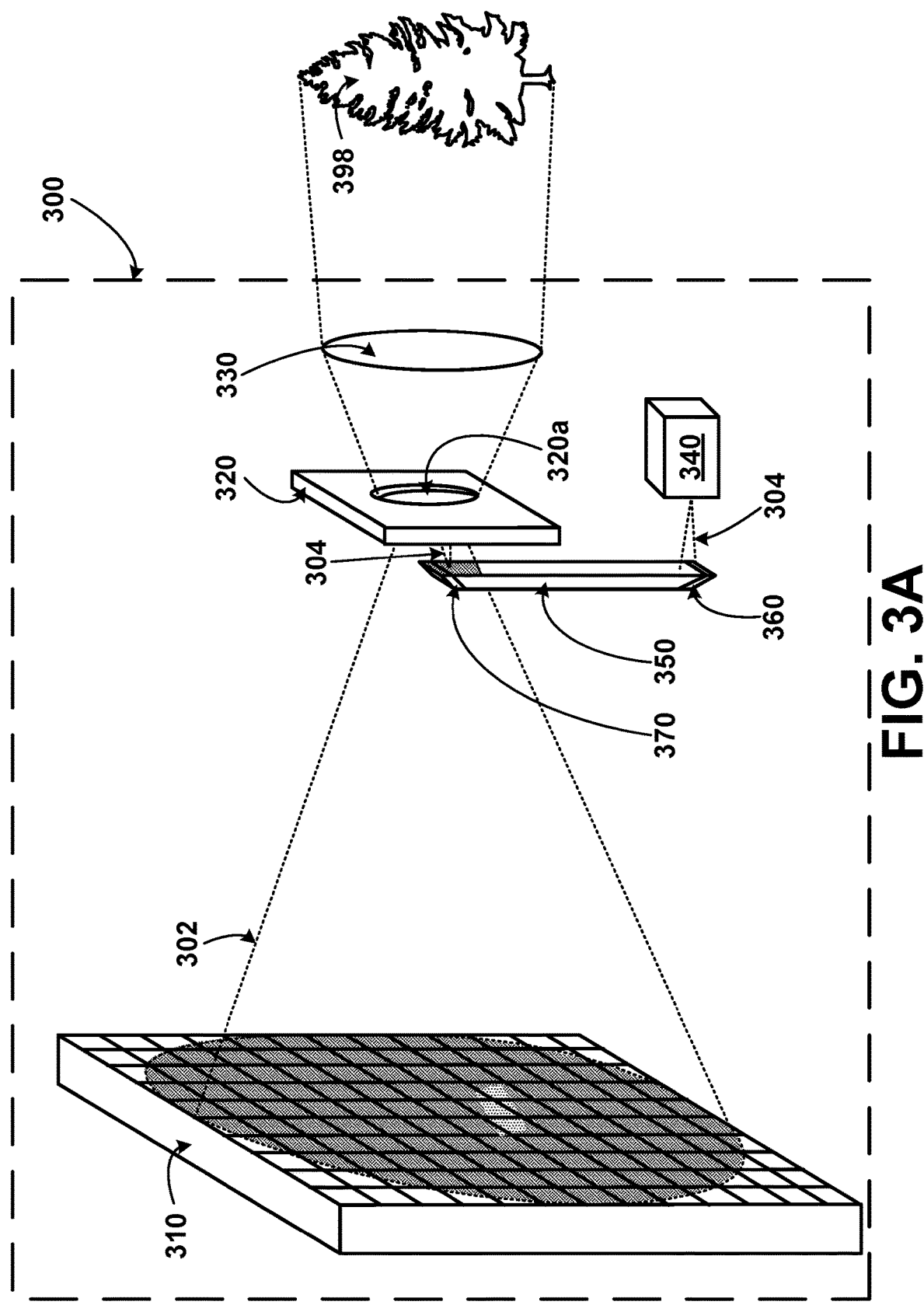
FIG. 3A is an illustration of a system that includes a waveguide, according to example embodiments.

FIG. 3A is an illustration of a system 300 that includes a waveguide 350, according to example embodiments. In some implementations, system 300 can be included in device 200 instead of or in addition to transmitter 240 and system 290. As shown, system 300 may measure light 302 reflected by an object 398 within a scene similarly to, respectively, system 100, light 102, and object 198. Further, as shown, system 300 includes a light detector array 310, an opaque material 320, an aperture 320a, a lens 330, and a light source 340, which may be similar, respectively, to array 110, material 120, aperture 120a, lens 130, and emitter 140. For the sake of example, aperture 320a is shown to have a different shape (elliptical) than a shape of aperture 120a (rectangular). Other aperture shapes are possible.

As shown, system 300 also includes waveguide 350 (e.g., optical waveguide, etc.). To that end, waveguide 350 can be formed from a glass substrate (e.g., glass plate, etc.), a photoresist material (e.g., SU-8, etc.), or any other material at least partially transparent to one or more wavelengths of emitted light 304.

As shown, system 300 also includes an input mirror 360 and an output mirror 370. Mirrors 360, 370 may be formed from any reflective material that has reflectivity characteristics suitable for reflecting (at least partially) wavelengths of light 304. To that end, a non-exhaustive list of example reflective materials includes gold, aluminum, other metal or metal oxide, synthetic polymers, hybrid pigments (e.g., fibrous clays and dyes, etc.), among other examples.

In the example shown, waveguide 350 is positioned between opaque material 320 and array 310. However, in other examples, opaque material 320 can be instead positioned between waveguide 350 and array 310.

As shown, waveguide 350 may be arranged such that a portion of waveguide 350 extends into a propagation path of focused light 302, and another portion of waveguide 350 extends outside the propagation path of focused light 302. As a result, a first portion of focused light 302 may be projected onto waveguide 350 (as illustrated by the shaded region on the surface of waveguide 350).

Figure 3B:
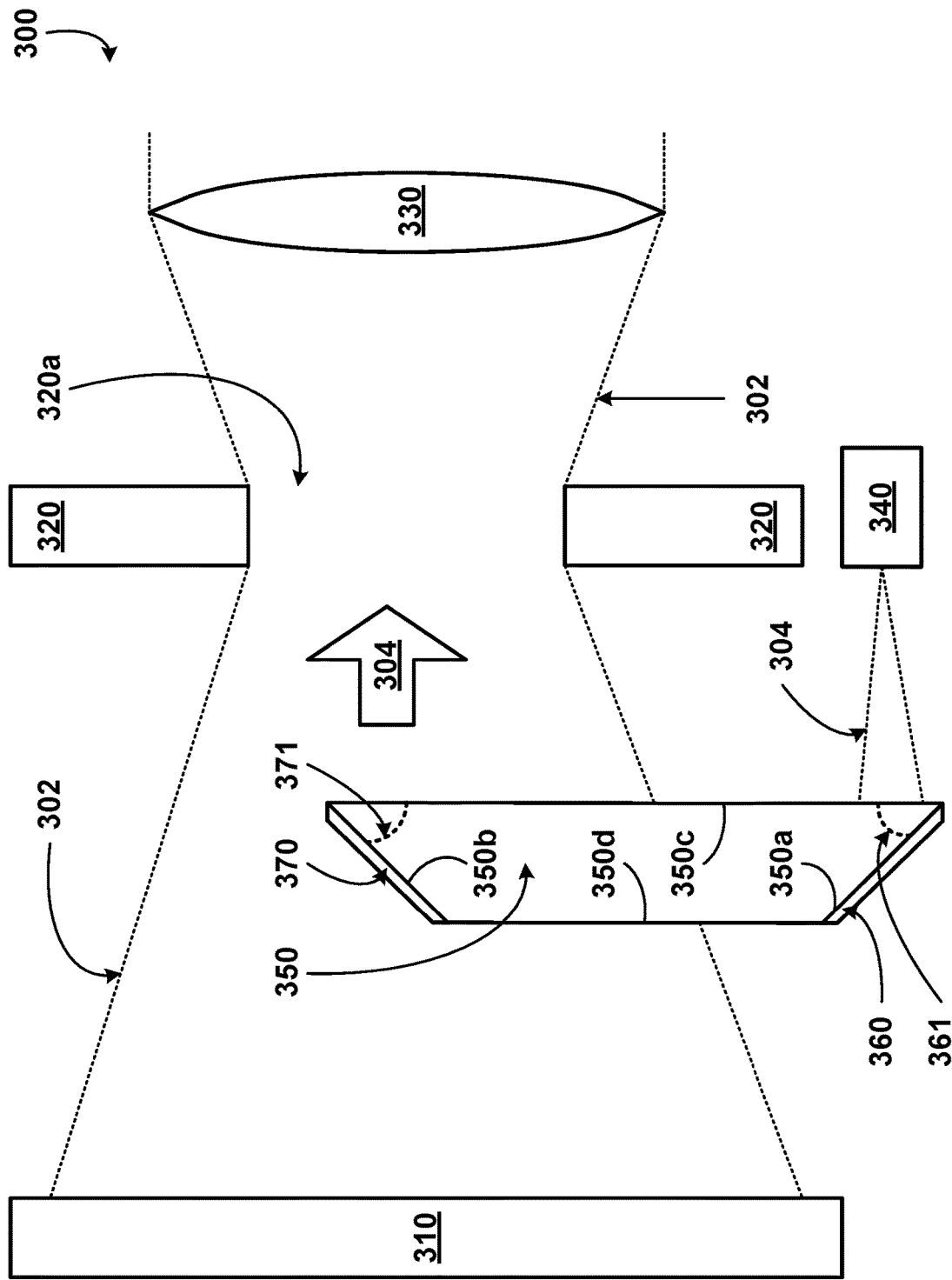
FIG. 3B illustrates a cross-section view of the system of FIG. 3A.

FIG. 3B illustrates a cross-section view of system 300. As best shown in FIG. 3B, a second portion of focused light 302 may propagate from lens 330 to array 310 without propagating through waveguide 350.

In some instances, at least part of the first portion of focused light 302 (projected onto waveguide 350) may propagate through transparent regions of waveguide 350 (e.g., from side 350c to side 350d and then out of waveguide 350 toward array 310, without being intercepted by mirror 370. However, in some instances, the first portion of focused light 302 may be at least partially intercepted by mirror 370 and then reflected away from array 310 (e.g., guided inside waveguide 350, etc.).

To mitigate this, in some examples, mirror 370 can be configured to have a small size relative to aperture 320a and/or relative to a projection area of focused light 302 at the location of mirror 370. In these examples, a larger portion of focused light 302 may propagate adjacent to mirror 370 (and/or waveguide 350) to continue propagating toward array 310.

Alternatively or additionally, in some examples, mirror 370 can be formed from a partially or selectively reflective material (e.g., half mirror, dichroic mirror, polarizing beam splitter, etc.) that transmits at least a portion of focused light 302 incident thereon through mirror 370 for propagation toward array 310. Thus, in these examples as well, a larger amount of focused light 302 may eventually reach array 310.

In some examples, input mirror 360 may be configured to direct emitted light 304 (intercepted by mirror 360 from emitter 340) into waveguide 350. Waveguide 350 then guides light 304 inside waveguide 350 toward output mirror 370. Output mirror 370 may then reflect guided light 304 out of waveguide 350 and toward aperture 320a.

As best shown in FIG. 3B for example, input mirror 360 may be tilted at an offset angle 361 toward side 350c of waveguide 350. For example, an angle between mirror 360 and side 350c may be less than an angle between mirror 360 and side 360d. In one implementation, offset or tilting angle 361 of mirror 360 is 45°. However, other angles are possible. In the embodiment shown, input mirror 360 is disposed on side 350a of waveguide 350. Thus, in this embodiment, emitted light 304 may propagate into waveguide 350 through side 350c and then out of side 350a toward mirror 360. Mirror 360 may then reflect light 304 back into waveguide 350 through side 350a at a suitable angle of entry so that waveguide 350 can then guide light 304 toward side 350b. For example, waveguide 350 can be formed such that angle 361 between sides 350a and 350c is less than the angle between side 350a and side 350d (i.e., side 350a tilted toward side 350c). Input mirror 360 can then be deposited onto side 350a (e.g., via chemical vapor deposition, sputtering, mechanical coupling, or another process). However, in other embodiments, mirror 360 can be alternatively disposed inside waveguide 350 (e.g., between sides 350a and 350b), or may be physically separated from waveguide 350.

As best shown in FIG. 3B, output mirror 370 may also be tilted toward side 350c of waveguide 350. For example, an angle 371 between mirror 370 and side 350c may be less than an angle between mirror 370 and side 360d. In one implementation, offset or tilting angle 371 of mirror 370 is 45°. However, other angles are possible. Thus, in some examples, input mirror 360 may be tilted in a first direction (e.g., clockwise in the view of FIG. 3B) toward side 350c, and output mirror 370 may be tilted in a second direction (e.g., opposite to the first direction) toward side 350c. Output mirror 370 can be physically implemented in various ways similarly to mirror 360 (e.g., disposed on tilted side 350b of waveguide 350, etc.).

In some examples, waveguide 350 may be formed from a material that has a different index of refraction than that of materials surrounding waveguide 350. Thus, waveguide 350 may guide at least a portion of light propagating inside the waveguide via internal reflection (e.g., total internal reflection, frustrated total internal reflection, etc.) at one or more edges, sides, walls, etc., of waveguide 350. For instance, as shown in FIG. 3B, waveguide 350 may guide emitted light 304 (received from emitter 340) toward side 350b via internal reflection at sides 350c, 350d, and/or other sides of waveguide 350.

In the arrangement shown in FIG. 3B for instance, waveguide 350 may extend vertically (e.g., lengthwise) between sides 350a and 350b. In some examples, side 350c may correspond to an interface between a relatively high index of refraction medium (e.g., photoresist, epoxy, etc.) of waveguide 350 and a relatively lower index of refraction medium (e.g., air, vacuum, optical adhesive, glass, etc.) adjacent to side 350c. Thus, for instance, if guided light 304 propagates to side 350c at less than the critical angle (e.g., which may be based on a ratio of indexes of refractions of the adjacent materials at side 350c, etc.), then the guided light incident on side 350c (or a portion thereof) may be reflected back into waveguide 350. Similarly, guided light incident on side 350d at less than the critical angle may also be reflected back into waveguide 350. Thus, waveguide 350 may control divergence of guided light via internal reflection at sides 350c and 350d, for example. Similarly, waveguide 350 may extend through the page in the illustration of FIG. 3B between two opposite sides of waveguide 350 to control divergence of guided light 304. In some implementations, to facilitate controlling the divergence of light 304, sides 350c may be configured to be substantially parallel to side 350d.

Through this process, at least a portion of emitted light 304 (reflected by input mirror 360 into waveguide 350) may reach tilted side 350b. Output mirror 370 (e.g., disposed on side 350b) may then reflect the at least portion of guided light 304 toward side 350c and out of waveguide 350. For example, offset or tilting angle 361 can be selected such that reflected light 304 from input mirror 360 propagates into waveguide 350 in a particular direction so that light 304 reaches side 350c (or 350d) at less than the critical angle. As a result, input light 304 can be guided inside waveguide 350 toward side 350b by reflecting off sides 350c, 350d, etc. Similarly, offset or tilting angle 371 of output mirror 370 can be selected such that light 304 reflected by mirror 370 propagates toward a particular region of side 350c at greater than the critical angle. As a result, light 304 (reflected by output mirror 370) may be (at least partially) transmitted through side 350c rather than reflected (e.g., via total internal reflection etc.) back into waveguide 350. Further, mirror 370 can be oriented to reflect guided light 304 incident thereon toward aperture 320a. As shown in FIG. 3B for example, aperture 320a could be located adjacent to the particular region of side 350c, and may thus transmit light 304 toward lens 330. Lens 330 may then direct light 304 toward a scene.

Emitted light 304 may then reflect off one or more objects (e.g., object 398) in the scene, and return to lens 330 (e.g., as part of light 302 from the scene). Lens 330 may then focus light 302 (including the reflections of the emitted light beams) through aperture 320a and toward array 310.

With this arrangement, system 300 may emit light 304 from a substantially same physical location (e.g., aperture 320a) from which system 300 receives focused light 302 (e.g., aperture 320a). Because the transmit path of emitted light 304 and the receive path of focused light 302 are co-aligned (e.g., both paths are from the point-of-view of aperture 320a), system 300 may be less susceptible to the effects of parallax than the arrangement of system 290 and emitter 240 of device 200 (which are associated with physically separate lenses 230 and 231). For instance, data from a LIDAR device that includes system 300 could be used to generate a representation of the scene (e.g., point cloud) that is less susceptible to errors related to parallax.

It is noted that the sizes, positions, orientations, and shapes of the components and features of system 300 shown are not necessarily to scale, but are illustrated as shown only for convenience in description. It is also noted that system 300 may include fewer or more components than those shown, and one or more of the components shown could be arranged differently, physically combined, and/or physically divided into separate components.

In a first embodiment, the relative arrangement of array 310, aperture 320a, and waveguide 350 can vary. In a first example, opaque material 320 (and thus aperture 320a) can be alternatively disposed between array 310 and waveguide 350. For instance, waveguide 350 can be positioned adjacent to an opposite side of opaque material 320, while still transmitting emitted light 304 along a path that overlaps the propagation path of focused light 302 transmitted through aperture 320a. In a second example, array 310 can be alternatively disposed between waveguide 350 and opaque material 320. For instance, array 310 may include an aperture (e.g., cavity, etc.) through which emitted light 304 propagates toward aperture 320a (and lens 330).

In a second embodiment, array 310 can be replaced by a single light detector instead of a plurality of light detectors.

In a third embodiment, a distance between waveguide 350 and aperture 320a can vary. In one example, waveguide 350 can be disposed along (e.g., in contact with, etc.) opaque material 320. For instance, side 350c may be substantially coplanar with or proximal to aperture 320a. However, in other examples (as shown), waveguide 350 can be positioned at a distance (e.g., gap, etc.) from opaque material 320 (and aperture 320a).

In a fourth embodiment, system 300 could optionally include an actuator that moves lens 330, opaque material 320, and/or waveguide 350 to achieve a particular optical configuration (e.g., focus configuration, etc.) while scanning the scene. More generally, optical characteristics of system 300 can be adjusted according to various applications of system 300.

In a fifth embodiment, the position and/or orientation of aperture 320a can vary. In one example, aperture 320a can be disposed along the focal plane of lens 330. In another example, aperture 320a can be disposed parallel to the focal plane of lens 330 but at a different distance to lens 330 than the distance between the focal plane and lens 330. In yet another example, aperture 320a can be arranged at an offset orientation relative to the focal plane of lens 330. For instance, system 300 can rotate (e.g., via an actuator) opaque material 320 (and/or waveguide 350) to adjust the entry angle of light 302 and/or 304 into aperture 320a. By doing so, for instance, a controller (e.g., controller 292) can further control optical characteristics of system 300 depending on various factors such as lens characteristics of lens 330, environment of system 300 (e.g., to reduce noise/interference arriving from a particular region of the scanned scene, etc.), among other factors.

In a sixth embodiment, waveguide 350 can alternatively have a cylindrical shape or any other shape. Additionally, in some examples, waveguide 350 can be implemented as a rigid structure (e.g., slab waveguide) or as a flexible structure (e.g., optical fiber).

In a seventh embodiment, waveguide 350 may have a curved shape or other type of shape instead of the vertical rectangular configuration shown in FIGS. 3A and 3B. Thus, in this embodiment, array 310 and emitter 340 can be physically separated in a variety of ways, and waveguide 350 can guide emitted light 304 to output mirror 370 in any path (not necessarily a vertical or linear path as shown).

In an eighth embodiment, system 300 may alternatively omit input mirror 360. For instance, emitter 340 can be arranged to emit light 304 toward waveguide 350 at a suitable angle of entry so that it reflects off sides 350c, 350d, etc., without the presence of input mirror 370.

In a ninth embodiment, waveguide 350 can be alternatively implemented without tilting side 350a. For example, side 350a can be at a same (e.g., perpendicular, etc.) angle relative to sides 350c and 350d. With this arrangement for instance, emitter 340 can emit light 304 into side 350a (which might not be obstructed by mirror 360).

In a tenth embodiment, system 300 may include multiple output mirrors (between sides 350a and 350b of waveguide 350) instead of the single output mirror 370 shown, multiple apertures instead of the single aperture 320a shown, and multiple light detector arrays instead of the single array 310 shown. For example, a first output mirror may reflect a first portion of guided light 304 out of waveguide 350 toward a first aperture, and a remaining portion of the guided light may continue propagating inside the waveguide toward a second output mirror. The second output mirror may then reflect a second portion of the guided light out of the waveguide toward a second aperture, and so on. Thus, in this embodiment, system 300 may provide multiple co-aligned transmit/receive channels using a single waveguide.

In an eleventh embodiment, mirrors 360, 370 can be alternatively implemented as one or more optical elements (e.g., lenses, prisms, waveguides, etc.) configured to redirect light 304 emitted from emitter 340 into waveguide 350 (and/or toward aperture 320a). For example, mirror 360 and/or 370 can be implemented as total internal reflection (TIR) mirrors (e.g., prisms, etc.) or another optical element assembly disposed near sides 350a, 350b, etc., to direct light 304 into waveguide 350 and/or out of waveguide 350 toward aperture 320a.

In a twelfth embodiment, mirrors 360, 370 can be omitted from system 300, and waveguide 350 can instead be configured to perform the functions described above for mirrors 360, 370. For example, sides 350a and 350b of waveguide 350 can be implemented as TIR mirrors that reflect light 304 into or out of waveguide 350. For instance, tilting angle 361 (shown in FIG. 3B) can be selected such that light 304 arrives from emitter 340 at side 350a at less than the critical angle (e.g., associated with the refractive indexes of waveguide 350 and its surrounding medium). Alternatively or additionally, for instance, emitter 340 can be arranged to transmit light 304 toward side 350a (and/or side 350d) at less than the critical angle, such that light 350 may then be internally reflected inside waveguide 360 toward side 350b. Similarly, tilting angle 371 can be selected such that the guided light inside waveguide 350 is reflected by side 350b toward side 350c at greater than the critical angle (e.g., so that light 304 can then exit waveguide 350 at side 350c after reflecting off side 350b). Thus, in this example, waveguide 350 and mirrors 360, 370 can be implemented as a single physical structure (e.g., without using reflective materials).

Figure 4A:
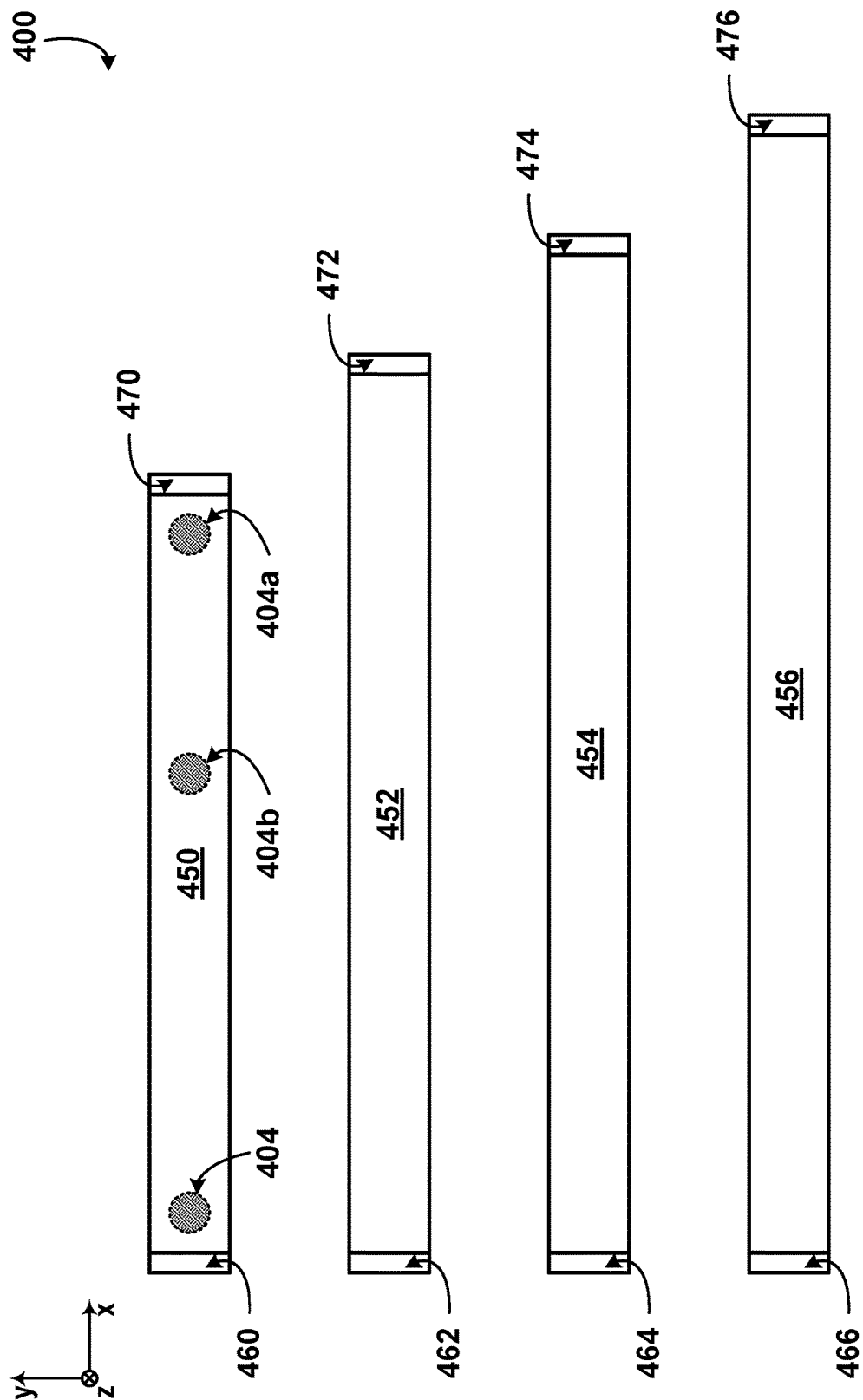
FIG. 4A illustrates a first cross-section view of a system that includes multiple waveguides, according to example embodiments.

FIG. 4A illustrates a first cross-section view of a system 400 that includes multiple waveguides 450, 452, 454, 456, according to example embodiments. For purposes of illustration, FIG. 4A shows x-y-z axes, where the z-axis extends through the page. System 400 may be similar to systems 100, 290, and/or 300, and can be used with device 200 instead of or in addition to system 290 and transmitter 240. For example, the side of waveguide 450 along the surface of the page may be similar to side 350c of waveguide 350.

As shown, system 400 includes a plurality of waveguides 450, 452, 454, 456, each of which may be similar to waveguide 350; a plurality of input mirrors 460, 462, 464, 466, each of which may be similar to mirror 360; and a plurality of output mirrors 470, 472, 474, 476, each of which may be similar to output mirror 370.

Figure 4B:
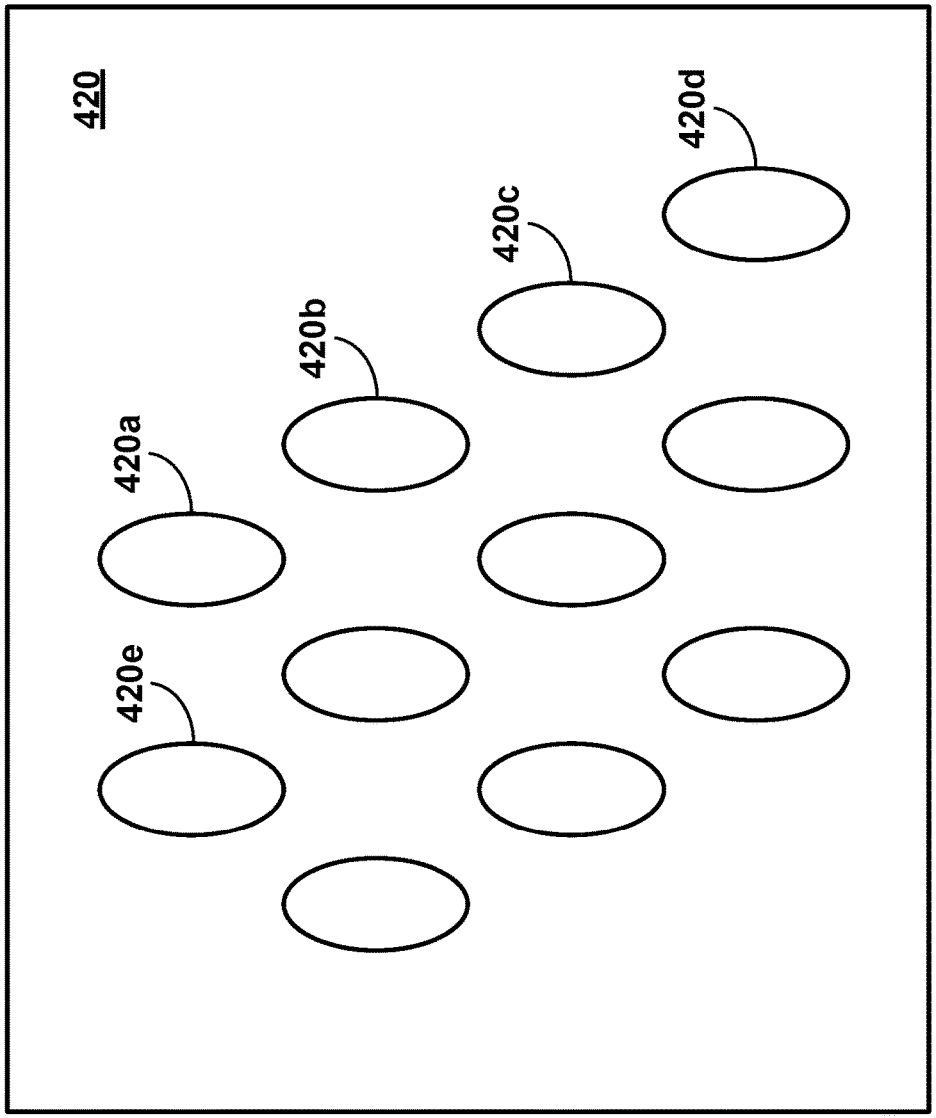
FIG. 4B illustrates a second cross-section view of the system of FIG. 4A.

FIG. 4B illustrates a second cross-section view of system 400, where the z-axis also extends through the page. As shown in FIG. 4B, system 400 also includes an opaque material 420, which may be similar to opaque material 320 of system 300; and a transmitter 440 that includes one or more light sources similar to light source 340.

Transmitter 440 may be configured to emit light (in the direction of the z-axis) toward waveguides 450, 452, 454, 456. As shown in FIG. 4A for example, emitted light 404 from the transmitter may be projected onto waveguide 450 at a location (shaded region) that overlaps input mirror 460, similarly to, respectively, emitted light 304, waveguide 350, and input mirror 350. To that end, transmitter 440 may include one or more light sources (e.g., laser bars, LEDs, diode lasers, etc.).

In a first embodiment, transmitter 440 may comprise a single light source that transmits light for all the waveguides 450, 452, 454, and 456. For example, system 400 may include one or more optical elements (not shown), such as lens, mirrors, beam splitters, etc., that split and direct respective portions of the light emitted by the single light source toward waveguides 450 (e.g., as light 404), 452, 454, and 456. With this arrangement, for example, a single light source can be used to drive multiple transmit channels of system 400 (e.g., where each transmit channel is associated with a location of a corresponding output mirror).

In a second embodiment, a given light source in transmitter 440 can be used to drive fewer or more than four waveguides. For example, transmitter 440 may include a first light source that emits light 404 toward input mirror 460, and a second light source that emits light (e.g., split into three separate light beams, etc.) for receipt at input mirrors 462, 464, and 466.

In a third embodiment, transmitter 440 may include a separate light source for driving each waveguide. For example, a first light source may emit light 404 toward mirror 460, a second light source may emit light toward mirror 462, a third light source may emit light toward mirror 464, and a fourth light source may emit light toward mirror 466.

Regardless of the number of light sources in transmitter 440, emitted light beams from the transmitter may then be guided into separate transmit paths (associated with the positions of the output mirrors) toward an environment of system 400.

For example, light beam 404 could be transmitted into a given surface of waveguide 450 (e.g., similar to side 350c of waveguide 350, etc.), as illustrated by the shaded region in FIG. 4A. Waveguide 450 may then guide light 404 toward one or more output mirrors arranged along a guiding direction of waveguide 460. For example, output mirror 470 may reflect a portion 404a of guided light 404 out of the page (e.g., in the direction of the z-axis), and through the given surface of waveguide 450 toward the scene. Thus, light portion 404a may define a first transmit channel (e.g., LIDAR transmit channel, etc.) that is associated with the transmit path described above.

Similarly, a second transmit channel of system 400 may be associated with a transmit path defined by waveguide 452 and output mirror 472; a third transmit channel associated with a transmit path defined by waveguide 454 and output mirror 474; and a fourth transmit channel may be associated with a transmit path defined by waveguide 456 and mirror 476. With this arrangement for instance, system 400 may emit a pattern of light beams, arranged according to locations of the output mirrors, toward a scene.

In some examples, a single waveguide can be used to define multiple transmit channels of system 400. As shown in FIG. 4A for example, another portion 404b of light 404 guided inside waveguide 450 may be transmitted out of waveguide 450 at a different location (shaded region) than the location from which portion 404a is transmitted out of waveguide 450. For instance, system 400 may include another tilted output mirror (not shown) that reflects light portion 404b out of waveguide 450 at the position shown in FIG. 4A. A remaining portion 404a of the guided light 404 may then continue propagating toward mirror 470 and then reflect out of waveguide 440 in line with the discussion above.

Returning now to FIG. 4B, opaque material 420 may define a plurality of apertures, exemplified by apertures 420a, 420b, 420c, 420d, and 420e, each of which may be similar to aperture 320a. For example, aperture 420a may be aligned (e.g., adjacent, overlapping, etc.) with output mirror 470 similarly to, respectively, aperture 320a and output mirror 370. For example, aperture 420a may overlap output mirror 470 in the direction of the z-axis to receive light 404a reflected by output mirror 470 out of waveguide 450. Similarly, aperture 420b can be aligned with output mirror 472, aperture 420c could be aligned with output mirror 474, and aperture 420d could be aligned with an output mirror 476. Thus, each aperture may be associated with a position of a respective transmit channel.

Additionally, in some examples, light from the scene (e.g., propagating into the page in FIG. 4B) may be focused onto opaque material 420, similarly to light 302 that is focused onto opaque material 320. In these examples, system 400 may thus provide multiple receive channels associated with respective portions of the focused light projected on opaque material 420 at the respective positions of apertures 420a, 420b, 420c, 420d, etc.

For example, a first portion of the focused light transmitted through aperture 420a could be intercepted by a first light detector associated with a first receive channel, a second portion of the focused light transmitted through aperture 420b could be intercepted by a second light detector associated with a second receive channel, a third portion of the focused light transmitted through aperture 420c could be intercepted by a third light detector associated with a third receive channel, and a fourth portion of the focused light transmitted through aperture 420d could be intercepted by a fourth light detector associated with a fourth receive channel.

With this arrangement, each transmit channel may be associated with a transmit path that is spatially co-aligned (through a respective aperture) with a receive path associated with a corresponding receive channel. Thus, system 400 can mitigate the effects of parallax by providing pairs of co-aligned transmit/receive channels defined by the locations of apertures 420a, 420b, 420c, 420d, etc.

Figure 4C:
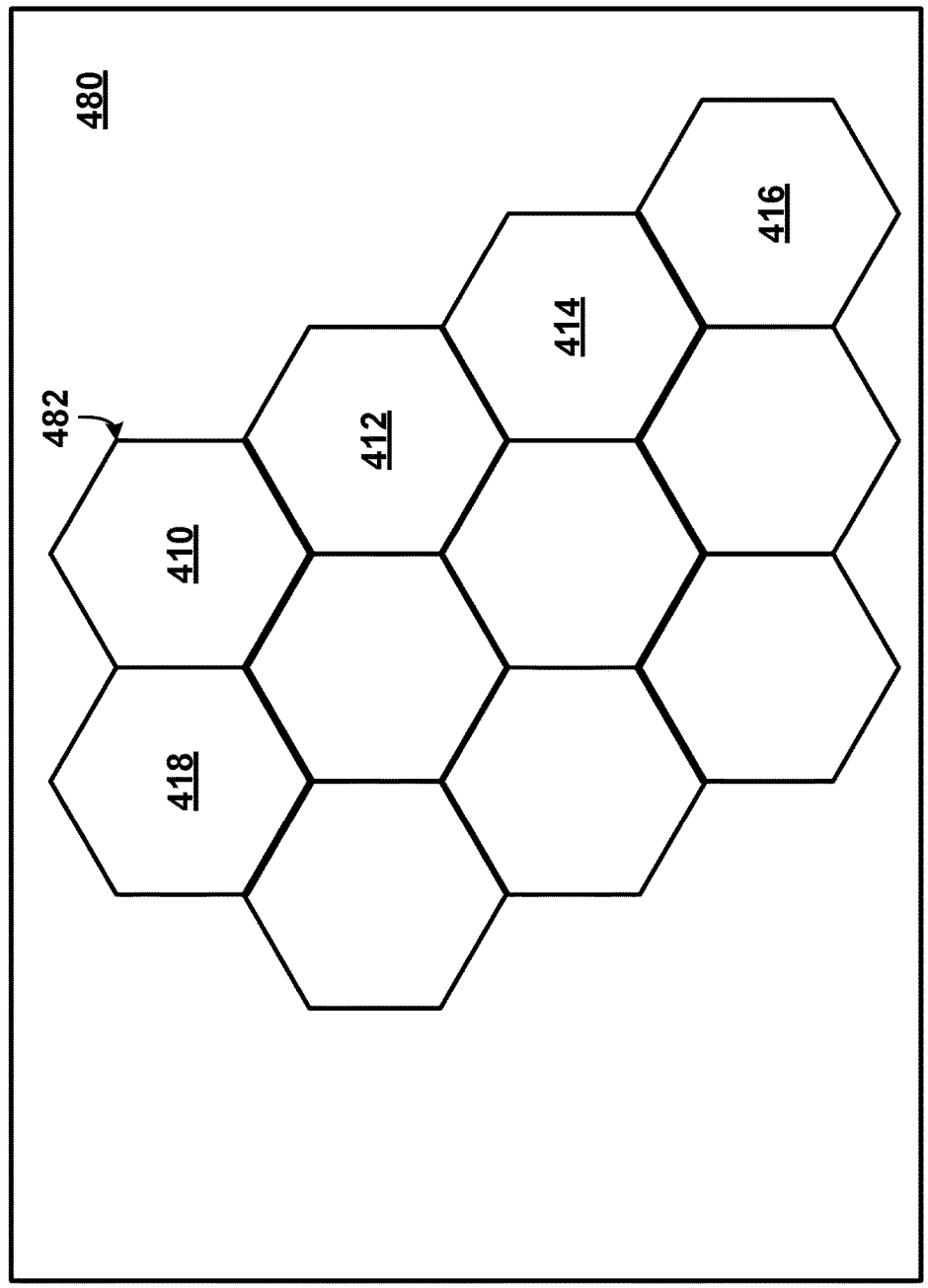
FIG. 4C illustrates a third cross-section view of the system of FIG. 4A.

FIG. 4C illustrates a third cross section view of system 400, in which the z-axis is also pointing out of the page. For example, one or more of the components of system 400 shown in FIG. 4B may be positioned above or below (e.g., in the direction of the z-axis) one or more of the components shown in FIG. 4A.

As shown in FIG. 4C, system 400 also includes a support structure 480 that mounts a plurality of receivers, exemplified by receivers 410, 412, 414, 416, and 418. Further, as shown, system 400 also includes one or more light shields 482.

Each of receivers 410, 412, 414, 416, 418, etc., may include one or more light detectors. Additionally, each receiver may be arranged to intercept focused light transmitted through a respective aperture of opaque material 420 (shown in FIG. 4B). For example, receivers 410, 412, 414, 416, 418 may be arranged to intercept focused light that is transmitted, respectively, through apertures 420a, 420b, 420c, 420d, 420e (shown in FIG. 4B). In one embodiment, receivers 410, 412, 414, 416 may be positioned to overlap (e.g., in the direction of the z-axis), respectively, output mirrors 470, 472, 474, 476. In some examples, each of receivers 410, 412, 414, 416, 418, etc., may include a respective array of light detectors connected in parallel to one another (e.g., SiPM, MPCC, etc.), similarly to the light detectors in any of the arrays 110, 210, or 310. In other examples, each receiver may include a single light detector.

Accordingly, in some examples, system 400 includes a plurality of light detectors (e.g., 410, 412, 414, 416, etc.) that are arranged according to an arrangement of a plurality of output mirrors (e.g., 470, 472, 474, 476, etc.).

Support Structure 480 may include a solid structure that has material characteristics suitable for supporting receivers 410, 412, 414, 416, 418, etc. In one example, support structure 480 may include a printed circuit board (PCB) to which the light detectors of receivers 410, 412, 414, 416, 418, etc., are mounted.

Light shield(s) 482 may comprise one or more light absorbing materials (e.g., black carbon, black chrome, black plastic, etc.) arranged around receivers 410, 412, 414, 416, 418, etc. In some examples, light shield(s) 482 may prevent (or reduce) light from external sources (e.g., ambient light, etc.) from reaching receivers 410, 412, 414, 416, 418, etc. Alternatively or additionally, in some examples, light shield(s) 482 may prevent or reduce cross-talk between receive channels associated with receivers 410, 412, 414, 416. Thus, light shield(s) 482 may be configured to optically separate receivers 410, 412, 414, 416, etc., from one another. In the example shown, light shield(s) 482 may be shaped in a honeycomb structure configuration, where each cell of the honeycomb structure shields light detectors of a first receiver (e.g., receiver 410) from light propagating toward light detectors in a second adjacent receiver (e.g., receiver 412). Other shapes and/or arrangements of light shield(s) 482 (e.g., rectangular-shaped cells, other shapes of cells, etc.) are possible.

Figure 4D:
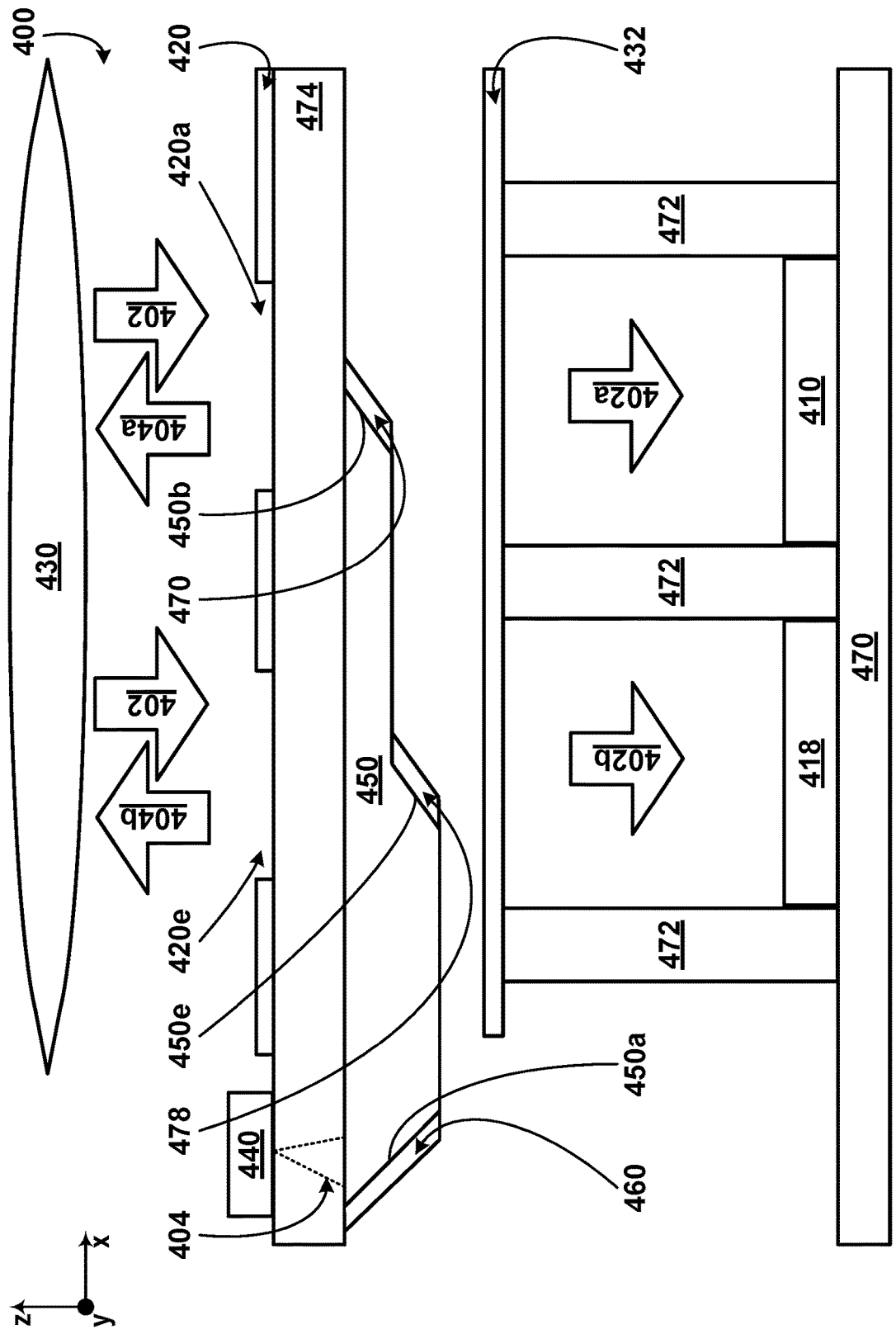
FIG. 4D illustrates a fourth cross-section view of the system of FIG. 4A.

FIG. 4D illustrates a fourth cross-section view of system 400, where the y-axis is pointing through of the page. As shown in FIG. 4D, system 400 also includes a lens 430, a light filter 432, a substrate 474, and an output mirror 478. As shown in FIG. 4D, waveguide 450 may be at a first distance to lens 430, and receivers 410, 418 may be at a second (greater) distance to lens 430.

Lens 430 may be similar to lens 330. For example, lens 430 may focus light 402 toward opaque material 420 similarly to, respectively, lens 330, focused light 302, and opaque material 320. Respective portions of focused light 402 may then be transmitted, respectively, through apertures 420a, 420b, 420c, 420d, 420e, etc. (shown in FIG. 4B). As shown in FIG. 4D for example, a first portion 402a of focused light 402 may be transmitted through aperture 420a toward waveguide 450 and receiver 410. Similarly, a second portion 402b of focused light 402 may be transmitted through aperture 420e toward waveguide 450 and receiver 418.

Additionally, as noted above, each aperture may also correspond to a position from which a transmitted light beam was received by lens 430. Thus, lens 430 may direct each transmitted light beam propagating from a particular aperture to the same region of the scene from which lens 430 focuses received light into that same particular aperture. For example, transmitted light beam 404a may be directed by lens 430 to a first region of the scene according to the location of aperture 420a. A reflected portion of transmitted light beam 404a that returns back to lens 430 from the same first region may thus be focused by lens 430 into the same aperture 420a (i.e., as part of the first focused light portion 402a), for receipt by light detector 410. Similarly, a reflected portion of the second transmitted light beam 404b may be focused by lens 430 toward aperture 420e and light detector 418 as part of the second focused portion 402b.

Accordingly, in some embodiments, system 400 may be configured to emit a plurality of transmitted light beams (e.g., 404a, 404b) to illuminate a scene. In these embodiments, the plurality of light beams may be spatially arranged based on a physical arrangement of the plurality of mirrors (e.g., 470, 478, etc.).

Light filter 432 may be similar to light filter 132. For example, light filter 432 may include one or more devices configured to attenuate wavelengths of light 402 (e.g., other than wavelengths of emitted light 404, etc.). In some examples, filter 432 may extend horizontally (through the page; along the direction of the y-axis) to similarly attenuate light propagating toward waveguides 462, 464, and 466 (shown in FIG. 4A).

As shown in FIG. 4D, filter 432 may be disposed between the receivers (e.g., 410, 418, etc.) and the waveguides (e.g., 450, etc.) of system 400. In another embodiment, filter 432 may be alternatively disposed between the waveguides and the lens. In yet another embodiment, substrate 474 can be formed from a material that has the light filtering characteristics of filter 432. Thus, in this embodiment, filter 432 and substrate 474 may be implemented as a single physical structure. In still another embodiment, filter 432 can be implemented as multiple (e.g., smaller) filters that are each disposed between lens 430 and a respective one of the receivers. For instance, a first filter can be used to attenuate light propagating toward receiver 410, and a second separate filter can be used to attenuate light propagating toward receiver 418, etc. In one implementation, each one of the multiple filters can be disposed on a respective one of the receivers. For instance, a first filter can be formed on top of receiver 410, a second filter can be formed on top of receiver 418, and so on.

Substrate 474 can be formed from an (at least partially) transparent material configured to transmit at least some wavelengths of light (e.g., wavelengths of light 404, etc.) through the substrate. In one embodiment, substrate 474 may include a glass substrate (e.g., glass wafer). In some examples, substrate 474 may be transparent to visible light as well as to the wavelengths of light 404 (e.g., infrared light, etc.).

As shown, waveguide 450 has an input edge 450*a* and output edge 450*b*, which may be similar, respectively, to sides 350*a* and 350*b* of waveguide 350. As shown in FIG. 4D for example, input edge 450*a* may be tilted in a first direction (e.g., counterclockwise about the y-axis) toward an output side of waveguide 450 (e.g., the side mounted to substrate 474). As such, input mirror 460 can be deposited on the tilted input edge 450*a* to reflect light 404 (emitted by transmitter 440 toward input mirror 460) back into waveguide 450 (e.g., toward output mirror 470). Further, output edge 450*b* may be tilted in a second (opposite) direction (e.g., clockwise about the y-axis) toward the output side of waveguide 450. As such, output mirror 470 can be deposited on output edge 450*b* to reflect guided light portion 404*a* out of waveguide 450 and through aperture 420*a* toward lens 430.

As shown in FIG. 4D, waveguide 450 also has another output edge 450*e* that is tilted similarly to edge 450*b* toward the output side of waveguide 450. As such, output mirror 478 can be disposed on output edge 450*e* to reflect guided light portion 404*b* out of waveguide 450 and toward aperture 420*e*. Thus, in some examples, waveguide 450 may be configured to guide emitted light 402 received from an emitter (e.g., transmitter 44) toward a plurality of output mirrors (470, 478).

To that end, in some examples, waveguide 450 may have a first cross-sectional size between input edge 450*e* and output edge 450*e* that is different (e.g., greater) than a second cross-sectional size of waveguide 450 between output edge 450*e* and 450*b*. Thus, after reaching an output edge (e.g., 450*e*) in the guiding direction of waveguide 450 (e.g., positive direction on the x-axis), a first portion 404*b* of the guided light may be transmitted out of the waveguide as a first transmitted light beam (404*b*), and a second portion of the guided light may continue to propagate (in a smaller-sized section of the waveguide) toward the next output mirror (e.g., 470), that reflects (at least partially) the second portion of the guided light out of the waveguide as a second transmitted light beam (404*a*).

In some examples, substrate 474 may provide a platform for optically coupling (e.g., aligning, etc.) one or more components of system 400. For example, as shown, an output surface of waveguide 450 (e.g., similar to side 350*c* of waveguide 350) may be mounted on a first side of substrate 474. Further, as shown, transmitter 440 may be mounted on a second side of substrate 474 opposite to the first side. Additionally, as shown, opaque material 420 can be mounted on the second side of the substrate.

In one example, substrate 474 may be transparent to visible light. With this arrangement, in some scenarios, aligning transmitter 440 with mirror 460 can be performed more efficiently (e.g., because mirror 460 is viewable through substrate 474, etc.), than if transmitter 440 was instead adjacent to edge 450*a* of waveguide 450.

In another example, substrate 474 may include alignment marks (e.g., etched markings or cavities, etc.) on each side of the substrate. Such alignment marks can be accurately positioned (e.g., using a mask, etc.) during manufacture of substrate 474. In turn, the various components mounted to substrate 474 can be more accurately aligned by using such alignment marks. For example, a robotic tool can be used to deposit waveguides 450, 452, 454, 456, etc., onto the first side of substrate 474 can use the alignment marks to accurately deposit the material of waveguide 450. Similarly, the alignment marks can be used to more accurately place opaque material 420 and transmitter 440 on the second side of substrate 474.

In one example, opaque material 420 may define a grid of apertures along a focal plane of lens 430. In some examples, each aperture in opaque material 420 may transmit light for a respective transmit/receive channel associated with a respective portion of the FOV of lens 430 that is viewable through the respective aperture. In one embodiment, opaque material 420 may comprise four rows of 64 apertures, where each row of horizontally (e.g., along y-axis) adjacent apertures is separated by a vertical offset (e.g., along z-axis) from another row of apertures. In this embodiment, system 400 could thus provide 4*64=256 receive channels, and 256 co-aligned transmit channels. In other embodiments, system 400 may include a different number of transmit/receive channels (and thus a different number of associated apertures).

In one example, system 400 may include 32 waveguides (arranged similarly to waveguides 450, 452, 454, 456), and each waveguide may guide light that is divided into 8 transmitted light beams in a 2×4 grid arrangement (e.g., to drive 8 transmit/receive channels of system 400 that are spatially arranged as two rows of four apertures each). Other examples are possible.

In some implementations, system 400 can be rotated about an axis while scanning a surrounding environment using the plurality of co-aligned transmit/receive channels. Referring back to FIG. 2 for example, system 400 can be mounted on a rotating platform, similar to platform 294, that rotates about an axis (e.g., using actuator 296, etc.) while system 400 is transmitting light pulses and detecting reflections thereof (via apertures 420*a*, 420*b*, 420*c*, 420*d*, etc.). In this example, a controller (e.g., controller 292) or other computer system can receive LIDAR data collected using the co-aligned transmit/receive channels of system 400, and then process the LIDAR data to generate a 3D representation of the environment of system 400. In one implementation, system 400 can be employed in a vehicle, and the 3D representation may be used to facilitate various operations of the vehicle (e.g., detect and/or identify objects around the vehicle, facilitate autonomous navigation of the vehicle in the environment, display the 3D representation to a user of the vehicle via a display, etc.).

It is noted that the various sizes, shapes, and positions (e.g., distance between adjacent waveguides, etc.) shown in FIGS. 4A-4D for the various components of system 400 are not necessarily to scale but are illustrated as shown only for convenience in description. For example, although waveguides 450, 452, 454, 456 are shown in FIG. 4A to extend in a linear direction (e.g., along the direction of the x-axis), one or more waveguides may alternatively be implemented to extend in a curved path or a path having any different type of shape.

In some examples, one or more of the waveguides shown in FIG. 4A may alternatively extend in a lengthwise direction from an input side to an intermediate location, and then split into multiple branches (e.g., elongate members, etc.), where each branch includes one or more output edges and extends in a different direction than other branch(es) of the waveguide. Other examples are possible.

III. EXAMPLE METHODS

Figure 5:
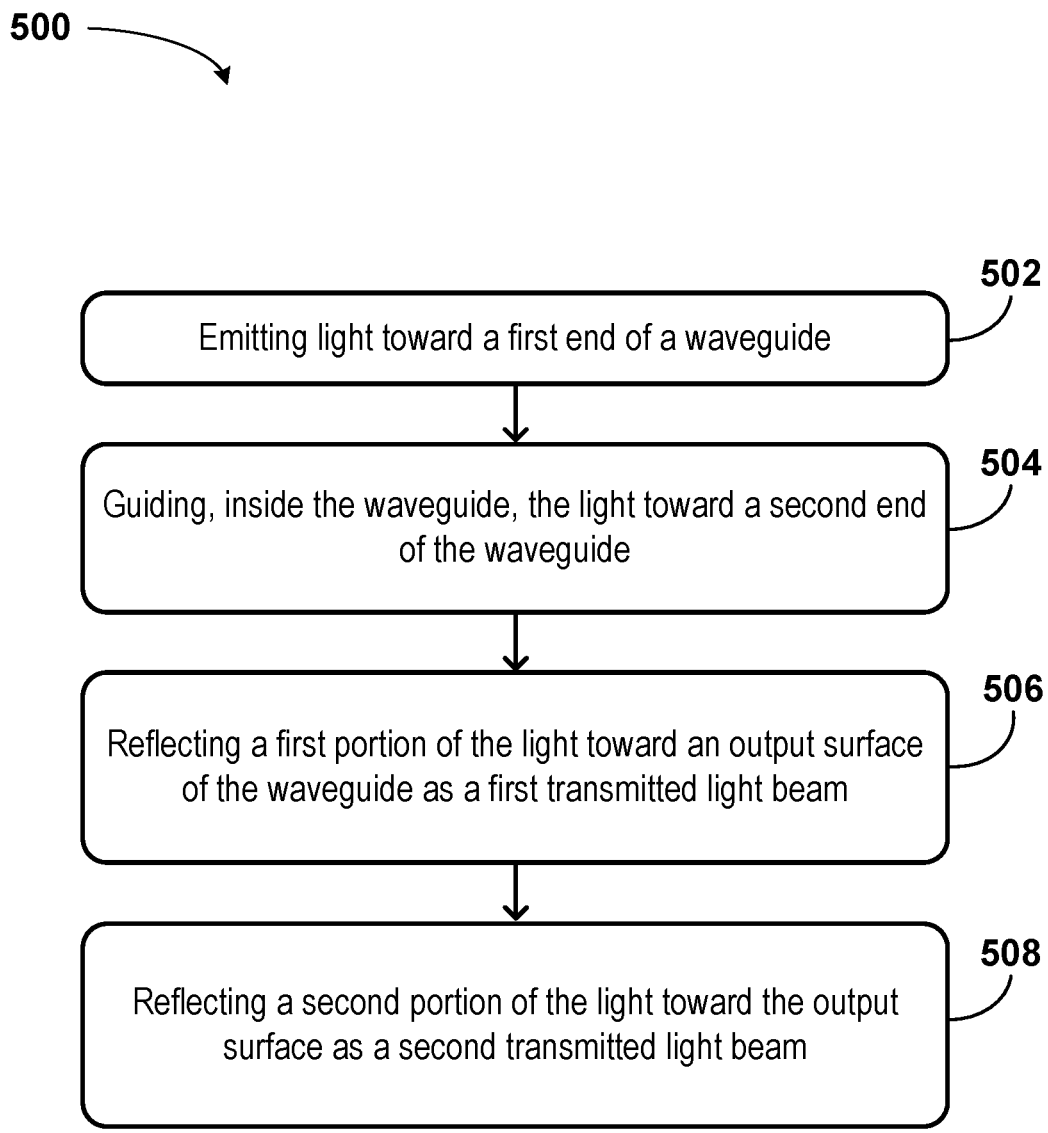
FIG. 5 is a flowchart of a method, according to example embodiments.

FIG. 5 is a flowchart of a method 500, according to example embodiments. Method 700 presents an embodiment of a method that could be used with systems 100, 290, 300, 400, and/or device 200, for example. Method 500 may include one or more operations, functions, or actions as illustrated by one or more of blocks 502-508. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for method 500 and other processes and methods disclosed herein, each block in FIG. 5 may represent circuitry that is wired to perform the specific logical functions in the process.

At block 502, method 500 involves emitting (e.g., via transmitter/emitter 440) light (e.g., 404) toward a first end (e.g., edge 450a) of a waveguide (e.g., 450). At block 504, method 500 involves guiding, inside the waveguide, the emitted light toward a second end (e.g., edge 450b) of the waveguide.

At block 506, method 500 involves reflecting (e.g., via output mirror 470) a first portion (e.g., 404a) of the guided light toward an output surface (e.g., surface of waveguide 450 mounted on substrate 474, output side 350c of waveguide 350, etc.) of the waveguide. In some examples, the first light portion (e.g., 404a) may be transmitted toward a scene as a first transmitted light beam. For example, light portion 404a may be directed by lens 430 toward the scene as the first transmitted light beam.

At block 508, method 500 involves reflecting (e.g., via output mirror 478) a second portion (e.g., 404b) of the guided light toward the output surface of the waveguide as a second transmitted light beam. Referring back to FIG. 4D for example, lens 430 may receive the first light portion 404a from a first position of aperture 420a, and the second light portion 404b from a second position of aperture 420e. In turn, lens 430 may transmit the first light beam 404a toward a first region of the scene, and may transmit the second light beam 404b toward a second region of the scene.

IV. CONCLUSION

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration only and are not intended to be limiting, with the true scope being indicated by the following claims.

What is claimed:

1. A system comprising:
a light emitter configured to emit light;
a waveguide having a first end, a second end, and an output surface between the first end and the second end;
an input mirror coupled to the first end of the waveguide, wherein the input mirror is configured to reflect the emitted light from the light emitter into the waveguide, such that the waveguide guides the emitted light toward the second end as guided light; and
an output mirror coupled to the second end of the waveguide, wherein the output mirror is configured to reflect at least a portion of the guided light out of the waveguide through the output surface, wherein the light reflected out of the waveguide by the output mirror propagates toward a scene as a transmitted light beam.

2. The system of claim 1, wherein the light emitter is a laser diode.

3. The system of claim 1, further comprising:
a light detector configured to receive light from the scene.

4. The system of claim 3, further comprising:
a lens configured to focus the light from the scene toward the light detector.

5. The system of claim 4, wherein the lens is further configured to direct the transmitted light beam toward the scene.

6. The system of claim 5, further comprising an opaque material that includes an aperture, wherein the aperture is positioned between the lens and the light detector such that the light detector receives the focused light via the aperture.

7. The system of claim 6, wherein the output mirror is positioned between the aperture and the light detector, and wherein the lens receives the transmitted light beam via the aperture.

8. The system of claim 1, wherein the input mirror receives the emitted light from the light emitter via the output surface of the waveguide.

9. The system of claim 8, wherein the input mirror is tilted in a first direction toward the output surface of the waveguide, and wherein the output mirror is tilted in a second direction toward the output surface of the waveguide.

10. The system of claim 9, further comprising:
a substrate having a first side and a second side opposite the first side, wherein the output surface of the waveguide is mounted on the first side of the substrate.

11. The system of claim 10, wherein the light emitter is mounted on the second side of the substrate.

12. A light detection and ranging (LIDAR) device comprising:
a light emitter configured to emit light;
a waveguide having a first end, a second end, and an output surface between the first end and the second end;
an input mirror coupled to the first end of the waveguide, wherein the input mirror is configured to reflect the emitted light from the light emitter into the waveguide, such that the waveguide guides the emitted light toward the second end as guided light;
an output mirror coupled to the second end of the waveguide, wherein the output mirror is configured to reflect at least a portion of the guided light out of the waveguide through the output surface, wherein the light reflected out of the waveguide by the output mirror propagates toward a scene as a transmitted light beam; and
a light detector configured to receive light from the scene.

13. The LIDAR device of claim 12, further comprising:
a lens configured to focus the light from the scene toward the light detector.

14. The LIDAR device of claim 13, wherein the lens is further configured to direct the transmitted light beam toward the scene.

15. The LIDAR device of claim 14, further comprising an opaque material that includes an aperture, wherein the aperture is positioned between the lens and the light detector such that the light detector receives the focused light via the aperture.

16. The LIDAR device of claim 15, wherein the output mirror is positioned between the aperture and the light detector, and wherein the lens receives the transmitted light beam via the aperture.

17. The LIDAR device of claim 12, wherein the input mirror receives the emitted light from the light emitter via the output surface of the waveguide.

18. The LIDAR device of claim 17, wherein the input mirror is tilted in a first direction toward the output surface of the waveguide, and wherein the output mirror is tilted in a second direction toward the output surface of the waveguide.

19. The LIDAR device of claim 18, further comprising:
a substrate having a first side and a second side opposite the first side, wherein the output surface of the waveguide is mounted on the first side of the substrate.

20. The LIDAR device of claim 19, wherein the light emitter is mounted on the second side of the substrate.

\* \* \* \* \*